United States Patent [19]

Beall et al.

[11] 3,840,856

[45] Oct. 8, 1974

[54] CHARACTER RECOGNITION TECHNIQUES

[75] Inventors: William Robert Beall, Rockville; Arthur F. Hermann, Jr., Silver Spring; Gary J. Murphy, Potomac, all of Md.

[73] Assignee: Input Business Machines, Inc., Rockville, Md.

[22] Filed: May 2, 1972

[21] Appl. No.: 249,511

[52] U.S. Cl. .............. 340/146.3 WD, 340/146.3 AG, 340/146.3 J

[51] Int. Cl. .............. G06k 9/12

[58] Field of Search ....... 340/146.3 AG, 146.3 WD, 340/146.3 MA, 146.3 AC, 146.3 J

[56] References Cited

UNITED STATES PATENTS

| | | | |
|---|---|---|---|
| 3,104,372 | 9/1963 | Rabinow | 340/146.3 AG |
| 3,245,037 | 4/1966 | Brust | 340/146.3 J |
| 3,465,288 | 9/1969 | Silverman | 340/146.3 J |
| 3,519,991 | 7/1970 | Kobayasai | 340/146.3 J |
| 3,714,631 | 1/1973 | Deschenes | 340/146.3 WD |

*Primary Examiner*—Gareth D. Shaw
*Assistant Examiner*—Robert F. Gnuse
*Attorney, Agent, or Firm*—James J. Burke

[57] ABSTRACT

A method of identifying a presented character, and the apparatus therefor, are provided in accordance with the teachings of the present invention. The presented character is scanned to derive an array of voltages representative of the information content of incremental elements that collectively form the presented character. The array of voltages are quantized at plural quantizing levels whereby a corresponding plurality of data field geometric configurations are developed. The data field geometric configurations are represented by binary signals and are in approximate conformity with the geometric pattern of the presented character. Each data field geometric configuration represents a normalized scanned pattern, thereby compensating for nonuniformities in the presented character. The information content of discrete areas of the plural data field geometric configurations is compared in a sequential manner with predetermined voltage characters and the compared discrete area is characterized as one of said predetermined voltage characters in response to a favorable comparison. The presented character is identified as a known type when a sequence of characterizations is obtained in a pre-established order associated with that known type.

24 Claims, 10 Drawing Figures

CHARACTER RECOGNITION TECHNIQUES

This invention relates to a method of identifying a presented character, and the apparatus therefor, and more particularly, to a method of and apparatus for accurately identifying a presented character notwithstanding irregularities and nonuniformities that might be present in said character.

BACKGROUND

In recent years, the use of automatic data processing equipment to perform many tasks heretofore reserved for manual effectuation has been universally encouraged. In employing such equipment, it is necessary to analyze the function to be performed by a general purpose digital computer and to supply that computer with suitable data encoded in a form compatible with the operation of the machine. Heretofore, a human operator has been required to interpret incoming data and to effect the operation of various coding devices provided as peripheral equipment for a general purpose digital computer. Thus, the human operator has been an interface between intelligible data provided in a human language and intelligible data provided in a machine language. In many instances, the operator must operate an appropriate keyboard device to directly transmit coded representations of data to the computer. Alternatively, an operator might prepare a magnetic tape, a punched tape, a punched card, a magnetic card, or the like, adapted to be directly read by suitable devices to permit the recovery of data represented thereon and to transmit said data to the computer.

It has been found that many of the translating functions performed by an operator have been limited to the mere encoding of alphanumeric characters in an appropriate machine language. A substantial improvement in speed and accuracy and a significant decrease in expense may be obtained if the operator is replaced by a device capable of automatically identifying the presented alphanumeric characters and encoding same into the proper machine language. Many prior art character recognition systems have been designed for specific applications wherein a single font of characters are presented thereto. Unfortunately, these prior art systems are intolerably unreliable when presented with a font other than that for which the system was specifically designed. In an attempt to overcome such unreliability, systems have been proposed wherein alphanumeric characters are printed in magnetic ink and electromagnetic techniques are employed to recognize the printed character. Although the magnetic system has achieved a more creditable success than that of other prior art systems, a magnetic character recognition system must be constructed of costly and complex elements. Moreover, applications of this system are limited solely to recognizing alphanumeric characters printed in magnetic ink. Machines capable of printing in magnetic ink and the magnetic ink itself are expensive.

Accordingly, an optical character reading system capable of high reliability and accuracy in reading alphanumeric characters admitting of various fonts has long been awaited. Although numerous prior art character recognition systems have been proposed, none has heretofore been enthusiastically accepted. One such prior art system recognizes an optical pattern by determining the average measured photoelectric brightness of an area containing that pattern and comparing the measurement with a multiple of stored standards. The ability to recognize various fonts requires representative standard characters representing each font to be stored and compared to the optical pattern presented. Unfortunately, this system requires an overwhelmingly large number of stored standards and a long and complicated process of comparison therewith.

Another prior art character recognition technique requires the storage of a large number of characteristic features inherent in an alphanumeric character notwithstanding the particular font of character. Detected features of the presented character are then compared to the stored characteristic features for each known character and error functions are derived therebetween. The presented character is identified as that one known character whose cumulative error function is a minimum. Unfortunately, the reliance upon differences between the presented character and a known character subject this technique to numerous misclassifications. Furthermore, a characteristic feature inherent in one character of one font might be exhibited by a completely different character of another font, yet such redundancy is not advantageously utilized.

Still other prior art character recognition techniques store the outlines or boundaries of alphanumeric characters, which outlines are typical for a number of fonts. A presented character is identified if its geometric configuration falls within one of the boundaries. However, erroneous identifications might obtain for those similar characters that are clearly representative of one type yet fall within the boundary of another type.

A still further prior art character recognition technique has adopted the principle of contour following wherein a light ray traces the outline of a presented character under the control of photosensors and computing circuits. Although satisfactory results have been obtained therefrom, contour following character recognition techniques require a highly complicated and expensive implementation. Additionally, this technique is extremely sensitive to interruptions of the contour being traced.

OBJECTS OF THE INVENTION

Therefore, it is an object of the present invention to provide a character recognition technique admitting of diverse application with numerous fonts.

It is another object of this invention to provide a method of identifying a presented character, and the apparatus therefor, that is relatively insensitive to nonuniformities in the presented character.

A further object of this invention is to provide a method of and apparatus for identifying a presented character wherein an array of voltages derived from the scanning of the presented character are quantized at a plurality of quantizing levels to develop a corresponding plurality of normalized data field geometric configurations.

Yet another object of this invention is to provide a method of identifying a presented character, and the apparatus therefor, wherein the information content of discrete areas of the presented character is correlated with pre-established data words and the sequence of correlation with such data words provides an identification of the presented character.

It is still further object of the instant invention to provide a method of and apparatus for identifying a presented character wherein a plurality of weighted data field geometric configurations consisting of binary signals is derived from a scanned representation of said presented character and wherein selected binary words are formed from each row of binary signals and compared to predetermined binary words; the order in which said formed binary words favorably compare to said predetermined binary words providing an identification of the presented character regardless of the particular weighted data field geometric configuration from which the formed binary words are selected.

Yet another object of the present invention is to provide a method of and apparatus for serially forming a data array corresponding to a scanned presented character and for determining when said serially formed array is completely formed.

Yet another object of this invention is to provide a method of and apparatus for deriving characteristic data words representative of discrete areas of a scanned character and comparing the derived data words with predetermined data words.

An additional object of this invention is to provide a method of and apparatus for representing an alphanumeric character by a sequence of certain ones of predetermined data words.

Another object of this invention is to provide a method of and apparatus for identifying a presented character by detecting a sequence of characteristic data words provided in a data field representation of said presented character and comparing said detected sequence with a plurality of known sequences, each said known sequence being associated with a known type of character.

A further object of the present invention is to provide a method of and apparatus for recognizing a scanned array of voltages, said scanned array being derived from a presented character, wherein discrete portions of said scanned array are compared to predetermined voltage characters, at least one of said voltage characters being representative of a similar portion of each of a number of known geometric patterns whereby said known geometric patterns may be represented by a relatively small number of predetermined voltage characters.

Various other objects and advantages of the invention will become clear from the following detailed description of exemplary embodiments thereof and the novel features will be particularly pointed out in connection with the presented claims.

SUMMARY OF THE INVENTION

In accordance with this invention, a method of identifying a presented character, and the apparatus therefor, are provided wherein the presented character is scanned to derive an array of voltages representative of the geometric configuration of said presented character; the array of derived voltages is quantized at a plurality of quantizing levels to develop a corresponding plurality of weighted data field geometric configurations of binary levels, each said weighted data field geometric configuration representing a normalized scanned pattern thereby compensating for nonuniformities in said presented character; the information content of discrete areas of each of said plurality of data field geometric configurations is compared with predetermined binary characters and a positive comparison is indicated when a discrete area and a predetermined binary character admit of a corresponding relationship whereby said discrete area is characterized as said binary character; when a sequence of characterizations is equal to one of a plurality of pre-established sequences, regardless of the particular weighted data field geometric configuration within which the characterized discrete area is disposed, the presented character is identified as a known type associated with that one pre-established sequence.

The invention will be more clearly understood by reference to the following detailed description of exemplary embodiments thereof in conjunction with the accompanying drawings in which.

GENERAL DESCRIPTION OF THE SYSTEM

Figure 1:
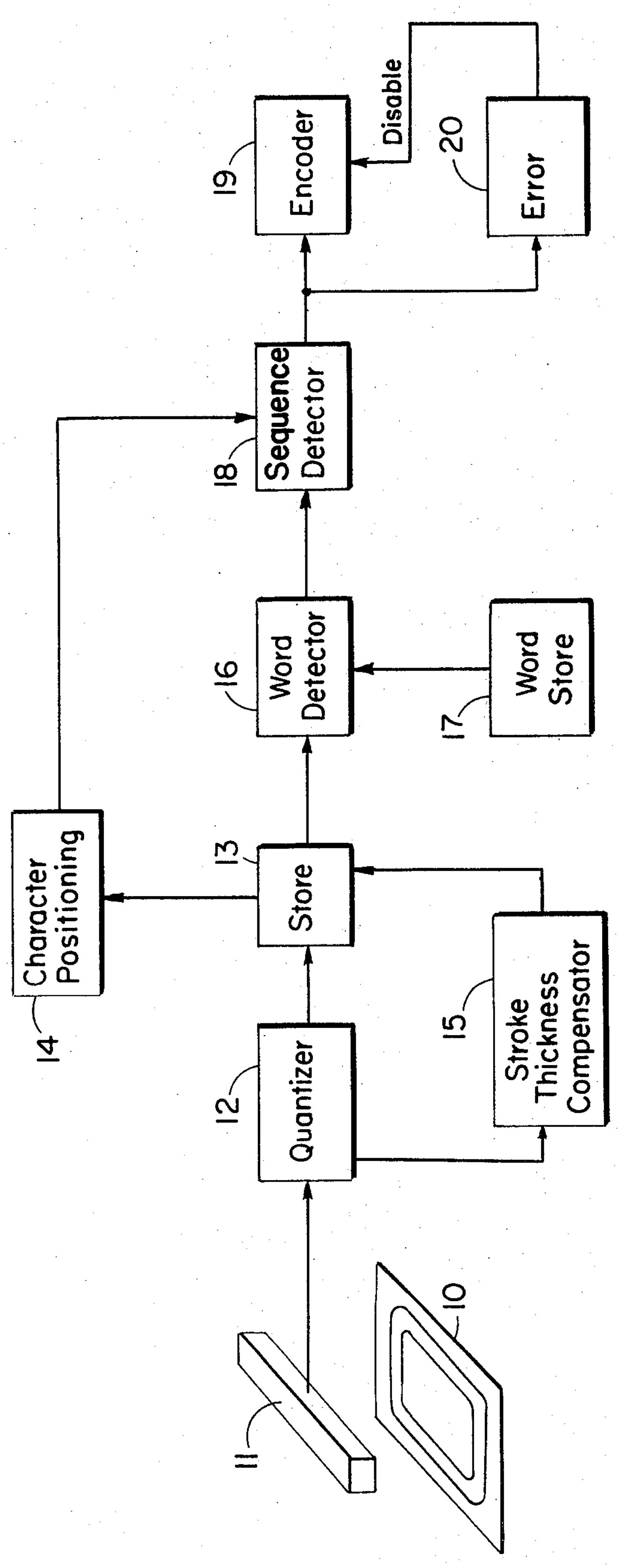
FIG. 1 is a block diagram of one embodiment of the present invention.

Referring now to the drawings wherein like component parts are identified by like reference numerals, and in particular to FIG. 1, there is illustrated a block diagram of a character recognition system in accordance with the present invention capable of carrying out the instant inventive method and comprising scanning means 11, quantizing means 12, storage means 13, word detecting means 16, sequence detecting means 18, coding means 19 and error detecting means 20. Scanning means 11 is in operable communication with a presented character 10 and is capable of deriving an array of voltages representative of the configuration of the presented character. For the purpose of describing the illustrated embodiment of the present invention, scanning means 11 will be assumed to be in optical communication with presented character 10 and serves to derive voltages that are a function of the intensity of light reflected to the scanning means from the surface of the presented character. Alternatively, the presented character may be printed in magnetic ink or the like and scanning means 11 may be in inductive communication therewith so as to derive voltages proportional to a sensed level of magnetic flux. In either embodiment, the array of voltages produced by scanning means 11 is a function of the geometric pattern exhibited by presented character 10. In the assumed embodiment, scanning means 11 may comprise a conventional photoresponsive device such as a flying spot scanner, a movable photoresistive cell, an array of phototransistors or an array of photodiodes. If a flying spot scanner is utilized herein, relative motion may be required to dispose the presented character 10 in a scanning zone.

Suitable circuitry may then be used to control the beam of the flying spot scanner to serially scan linear scanning elements across the surface of the presented character to generate a series of voltages representative of the entire scanned pattern. If an array of phototransistors or photodiodes is used, relative motion is imparted to said array or to the presented character to dispose the presented character in the scanning zone. If the array is comprised of a matrix array of phototransistors or photodiodes, such as an nxm array having m columns and n rows, a phototransistor or photodiode is positioned at each intersection of a column and a row. In an operable system of the type illustrated in FIG. 1, scanning means 11 was comprised of a linear array of n photodiodes adapted to scan in a column by column manner the geometric pattern comprising the presented character 10. The array of voltages thus representing a column of the scanned character may be produced in parallel by the scanning means or, alternatively, may be serially provided at an output terminal thereof. An exemplary embodiment of suitable scanning means is manufactured by IPL, a corporation of England, and is identified as Model No. EP-20. Such scanning means is comprised of a self-scanning photodiode array having FET-coupled circuitry wherein the output of a column of photodiodes is sequentially interrogated to produce at the output terminal of the scanning means a serial sequence of n voltages for each column scanned.

The output of scanning means 11 is coupled to quantizing means 12. The purpose of the quantizing means is to convert the representative voltages produced by the scanning means to corresponding binary signals. Thus, a voltage that exceeds a determined threshold level is converted by the quantizing means to a first binary signal, such as a binary "1," and a voltage that is less than the determined threshold level is converted to a second binary signal, such as a binary "0." Such quantizing means are well known in the art and further description thereof need not be provided. However, it should be noted, that if the array of voltages produced by scanning means 11 are simultaneously provided at a plurality of output terminals thereof, quantizing means 12 may include a corresponding plurality of quantizing circuits such that the quantizing operation is simultaneously performed on each of the provided voltages. Alternatively, if scanning means 11 produces a serial sequence of voltages, quantizing means 12 need include only a single quantizing circuit coupled to the output terminal of the scanning means to perform the quantizing operation on each of the sequentially produced voltages.

Quantizing means 12 is coupled to storage means 13. In addition, stroke thickness compensating means 15 is provided between the quantizing means and the storage means. Stroke thickness compensating means 15 is adapted to compensate for nonuniformities in presented character 10 that might be deleteriously reproduced by quantizing means 12. Thus, if the presented character is formed of relatively thick strokes, that is, if the lines forming the geometric pattern of the presented character are relatively thick, the array of voltages applied to quantizing means 12 might exhibit an average magnitude that is too high. Similarly, if the presented character is formed of relatively thin strokes, the array of voltages applied to quantizing means 12 might exhibit an average magnitude that is too low. To minimize the possibility of erroneous classification of a presented character that is formed of strokes that are either too thick or too thin, stroke thickness compensating means 15 serves to normalize the representative voltages produced by scanning means 11 such that the binary signals produced in response thereto accurately depict the geometric configuration of the presented character. In a preferred embodiment of the present invention, stroke thickness compensating means 15 is comprised of additional quantizing means which, when taken in combination with aforedescribed quantizing means 12 forms a multi-level quantizing means for quantizing the voltages produced by scanning means 11 at plural quantizing levels to develop a corresponding plurality of binary signals. In an operable embodiment of the instant invention the multi-level quantizing means is provided with three discrete quantizing levels to thereby develop weighted binary signals. The multi-level quantizing means may therefore be provided with three parallel connected quantizing circuits of known design to produce three discrete binary signals in response to each serially supplied voltage produced by scanning means 11. Hence, an upper quantizing level is provided to develop a first weighted binary signal when scanning means 11 produces a voltage derived from a presented character formed of relatively thick strokes. Similarly, a low quantizing level is provided to develop a second weighted binary signal when scanning means 11 derives a voltage from a presented character formed of relatively thin strokes. Further, an intermediate quantizing level is provided to develop a third weighted binary signal when scanning means 11 derives a voltage from a presented character formed of relatively normal strokes. The provided quantizing levels are dependent upon the intensity of light reflected from the background upon which the presented character is disposed so that an accurate representation of a scanned stroke may be developed. Hence, contrast control circuitry may be included in the multi-level quantizing means.

Storage means 13 is adapted to store each of the weighted binary signals produced by the multi-level quantizing means to thereby retain field arrays of binary levels, each representing weighted geometric configuration of binary signals that is in approximate conformity with the geometric configuration of presented character 10. More particularly, storage means 13 may comprise a plurality of storage registers corresponding in number to the number of quantizing levels with which the multilevel quantizing means is provided. If scanning means 11 is comprised of an nxm array of photoresponsive devices, each storage register may be provided with a total of nm stages capable of being simultaneously supplied with binary signals developed from the array of voltages produced by the scanning means. In the preferred embodiment wherein scanning means 11 is comprised of a column of photoresponsive devices that are sequentially interrogated, each storage register included in storage means 13 may be comprised of a total of nm shift register stages adapted to be serially supplied with the binary signals developed from the serial sequence of voltages produced by scanning means 11. To facilitate a ready understanding of the present invention the shift register stages may be considered to be configured in an nxm matrix array having m columns and n rows, thereby forming a data field geometric configuration that represents the scanned pattern. It is appreciated that storage means 13 is adapted to store a plurality of weighted data field geometric configurations, thereby forming a first field array representing a normalized character if said character is formed of relatively thick strokes, a second field array representing a normalized character if said character is formed of relatively thin strokes and a third field array representing a character if said character is formed of relatively normal strokes, respectively.

Word detecting means 16 is coupled to storage means 13 and is adapted to examine each discrete area forming each weighted data field geometric configuration to determine if the information content of each examined discrete area is of a predetermined designation. More particularly, the information content of a discrete area is detected as a binary word. The detected binary word is then compared to a plurality of stored predetermined binary words. A favorable comparison therebetween results in a characterization of said detected binary word as one of said predetermined words. Word detecting means 16 may comprise a content addressable memory, well known to those of ordinary skill in the art, capable of being supplied with the binary signals stored in each row of stages included in storage means 13. A row of stored binary signals may therefore be seen to comprise a binary word, which word is compared to the plurality of words stored in word storage means 17. Word storage means 17 may comprise a conventional read only memory, a program stored memory or a hard wired memory. The predetermined binary words stored in the word storage means may be representative of the information content of each row of scanned ideal characters and, in fact, may be derived in response to the scanning of such ideal characters. It will be appreciated that a single predetermined binary word may represent a scanned line of more than only one alphanumeric character. For example, a scanned line of the bottom portion of the character "8" is substantially similar in configuration to a scanned line of the bottom portion of the character "0." Hence, a predetermined binary word may be utilized to represent a scanned line of a number of alphanumeric characters. Word storage means 17 is adapted to store all of said representative predetermined binary words to permit word detecting means 16 to identify the binary words stored in each row of the storage registers included in storage means 13. It is contemplated, therefore, that word detecting means 16 may include conventional correlating circuits capable of correlating the information content of each row of stages included in storage means 13 with the predetermined binary words stored in word storage means 17.

Sequence detecting means 18 is coupled to word detecting means 16 and is capable of sensing the order in which each row of binary signals is identified by word detecting means 16. The sequence detecting means is capable of storing a plurality of known sequences, each representing an alphanumeric character of a known type. As each row of binary signals stored in storage means 13 is identified as being one of a predetermined plurality of binary words, the sequence of identified words is compared to each of the stored knon sequences. A favorable comparison between a derived sequence and one of the known sequences results in an identification of presented character 10 as being the alphanumeric character associated with the known sequence.

Figure 2:
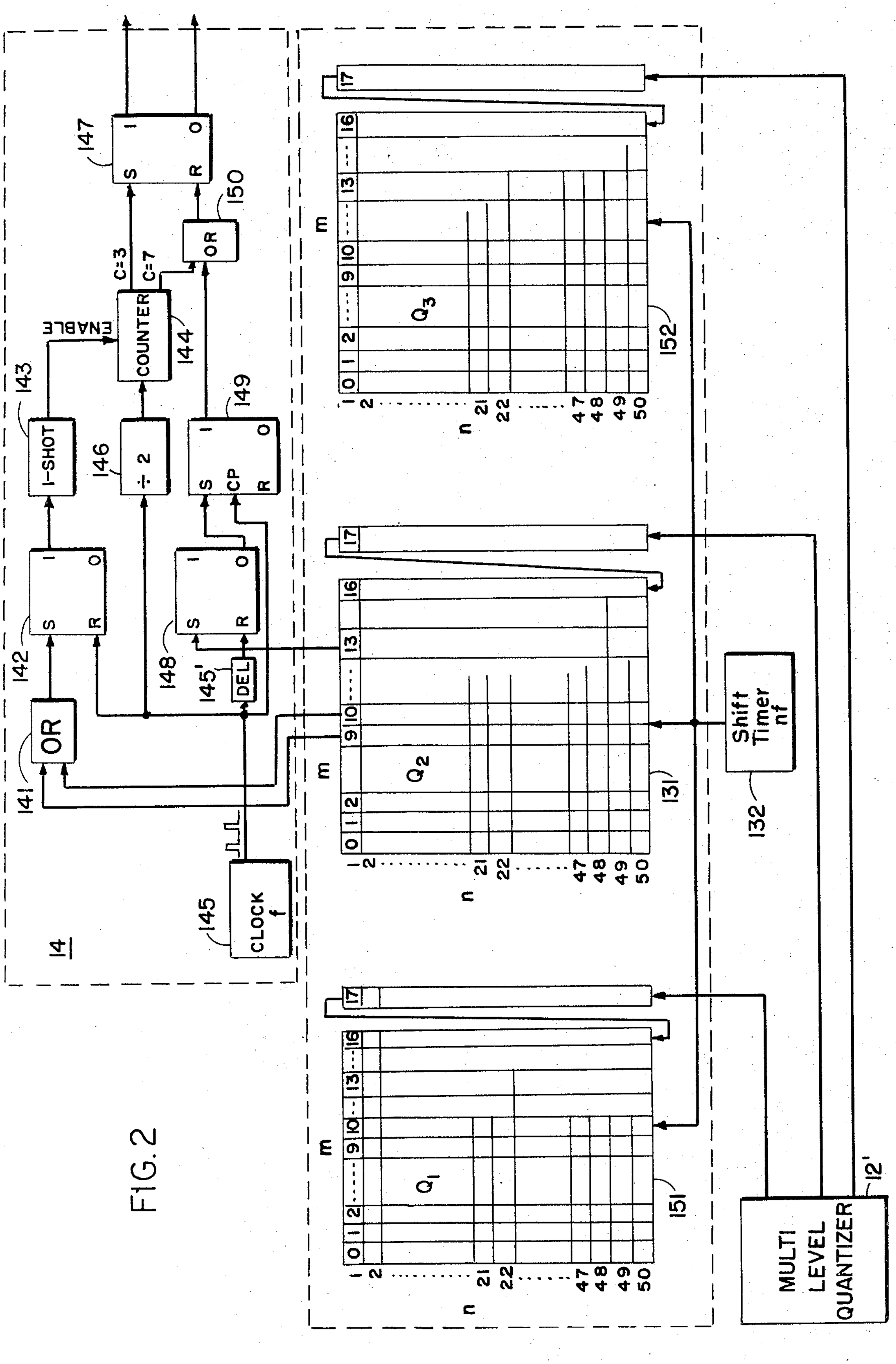
FIG. 2 is a block diagram of a portion of the system illustrated in FIG. 1.

As illustrated in FIG. 1, sequence detecting means 18 is additionally coupled to character positioning means 14, the latter being coupled to storage means 13. Character positioning means 14 is particularly adapted to sense when the arrays of binary signals serially supplied to storage means 13 are centered therein such that the weighted data field geometric configurations are properly positioned within the storage means. A detailed description of character positioning means 14 is provided hereinbelow with respect to FIG. 2. Hence, further description thereof is deferred until the apparatus represented by the illustration of FIG. 2 is described in detail. A sufficient understanding of the system illustrated in FIG. 1 may be obtained merely by noting that character positioning means 14 is adapted to produce a signal indicating the proper positioning of the weighted data field geometric configurations within storage means 13 and to apply said signal to an enabling input terminal of sequence detecting means 18. The sequence detecting means is thus inhibited from recognizing a derived sequence of identified binary words during that period when invalid word identification might occur (i.e., prior to the effective completion of the scanning operation by scanning means 11). It should be recognized that if storage means 13 is capable of being simultaneously supplied with nm binary signals representing an entire scanned character, character positioning means 14 may be omitted.

If the character recognition system illustrated herein is to be utilized to provide further apparatus with a translation of the intelligible data presented thereto from a human language to a machine language, the output of sequence detecting means 18 may be coupled to encoding means 19. Encoding means 19 may comprise a conventional coding device capable of producing a unique binary coded signal for each of a plurality of input signals supplied thereto. Hence, sequence detecting means 18 may be provided with a number of output terminals equal to the number of known types of alphanumeric characters with which presented characters are to be identified. Each output terminal of the sequence detecting means may be coupled to a corresponding input terminal of encoding means 19 such that the unique binary coded signal is generated in response to an energization of a corresponding input terminal. In addition, conventional indicating means may be coupled to each of the output terminals of sequence detecting means 18 to provide an operator with suitable indications as to the identity of a presented character.

Error detecting means 20 is coupled to the output of sequence detecting means 18 and is adapted to prevent the erroneous identification of presented character 10 as being more than one predetermined type of alphanumeric character. The error detecting means is further capable of detecting when the presented character 10 does not correspond to any of the known types of alphanumeric characters and, therefore, cannot be positively identified. The output of error detecting means 20 is coupled to a disable input of encoding means 19 to prevent the encoding means from transmitting a binary coded signal representative of an erroneous character. A more detailed description of error detecting means 20 will be provided hereinbelow with respect to FIG. 6.

MULTI-LEVEL QUANTIZING

The operation of the character recognition system embodied in FIG. 1 will now be described. For the purpose of the present description it will be assumed that scanning means 11 is comprised of a linear array of *n* photodiodes capable of scanning a column of adjacent elements corresponding to a scanned line of presented character 10. Furthermore, the voltages produced by the linear array of photodiodes are sequentially provided at the output terminal of scanning means 11. However, it should be clearly understood, that the present invention contemplates a scanning array comprised of *n* rows and *m* columns of photodiodes capable of simultaneously producing output voltages representative of the light intensity reflected from the incremental areas comprising the presented character 10.

The serially produced voltages are applied to quantizing means 12 and to stroke thickness compensating means 15, collectively referred to hereinafter as multi-level quantizing means. Plural binary signals are, therefore, generated in response to each discrete voltage signal serially produced by scanning means 11. For the purpose of the present example, it will be assumed that the multi-level quantizing means produces three discrete binary signals for each serially produced voltage. The reason for utilizing three quantizing levels will become clear when it is recognized that nonuniformities in the presented character or a slight misalignment between the scanning means 11 and the presented character might result in a voltage produced by a particular photodiode that either exceeds or falls short of a desired magnitude. This may be better understood by reference to FIG. 7A wherein the alphanumeric character "0" is considered in juxtaposition to successive scanning columns 0–17. With reference to scanning column 2 which, it is recognized, may be assumed to be the third successively scanned column during a scanning operation, the stroke is seen to be partially included in the column. Consequently, the voltages produced by the array of photodiodes included in scanning means 11 when column 2 is scanned will exhibit an intermediate magnitude. This magnitude will be quantized as a binary "0" by the high quantizing level and as a binary "1" by the low quantizing level. Thus, even though the scanned pattern is only partially included in the scanning column, a weighted binary signal will be produced that is, nevertheless, an accurate indication of the scanned pattern.

It is apparent that if the alphanumeric character "0" is formed of relatively thick strokes such that a scanned pattern is partially included in scanning column 1, the array of representative voltages produced by scanning means 11 when column 1 is scanned each admit of an intermediate magnitude. Nevertheless, the high quantizing level included in the multi-level quantizing means compensates for this nonuniformity by quantizing the intermediate magnitude voltage to a binary "0." In this manner, the multi-level quantizing means responds to each voltage produced by scanning means 11 during a scanning operation to provide a plurality of weighted binary signals to storage means 13. The storage means 13, which may include three storage registers, hereinafter referred to as the thick register, the normal register and the thin register, serially receives each weighted binary signal produced by the multi-level quantizing means to store in columnar form a field array representative of the geometric configuration of a normalized presented character. Thus, as each column of discrete elements is scanned by scanning means 11 a corresponding column of binary signals is stored in each of the thick, normal and thin registers of storage means 13.

It is recalled that each of the thick, normal and thin registers of storage means 13 stores a weighted data field geometric configuration in an nxm array of rows and columns. As each column is serially stored in a corresponding register, n rows of binary signals are developed. During the interval required to store an entire column of binary signals, word detecting means 16 examines each of the n rows of binary signals in each of the thick, normal and thin registers to determine if the signals stored in each examined row correspond to one of the predetermined binary words stored in word storage means 17. It is apparent that as each row is in the process of development, the binary signals included in one or more of such partially developed rows may correspond to a predetermined binary word stored in word storage means 17. Nevertheless, until the n rows of each register are fully developed, that is, until the weighted data field geometric configurations are properly positioned within the registers, the characterization of examined rows as predetermined binary words is not utilized by sequence detecting means 18 to identify the presented character.

CHARACTERIZATION OF THE DISCRETE AREAS COMPRISING A PRESENTED CHARACTER

The sequential examination of each row of the registers may be accomplished by utilizing either of alternative techniques. Word detecting means 16 may be coupled in sequence to a given row of each of the registers included in storage means 13 and the contents of the succeeding rows may be serially shifted thereto at a rate corresponding to the rate at which binary signals are serially shifted into the storage means. Thus, as the contents of each row are sequentially shifted to the next preceding row, word detecting means 16 serves to compare each successively shifted row of binary signals to the predetermined binary words stored in word storage means 17. Alternatively, the properly positioned weighted data field geometric configuration may be stationarily maintained in the registers of storage means 13 and word detecting means 16 may be sequentially coupled to each row. In adopting this latter technique, character positioning means 14 may be coupled to word detecting means 16 to activate the word detecting means to effect the sequential operation thereof once the weighted data field geometric configurations are properly positioned. In either embodiment, word detecting means 16 examines the first row of the thick register followed by the first row of the normal register followed by the first row of the thin register for a correspondence between the binary signals included in each said first row with the predetermined binary words stored in word storage means 17. This process is then repeated for each of the remaining rows in the thick, normal and thin registers.

It should here be noted that, regardless of the aforementioned alternative techniques adopted, word detecting means 16 may sense the content of only selected stages in a row to characterize said row as one of the predetermined binary words. For example, referring again to FIG. 7A, if a row of binary signals includes a binary "1" in each of stages 3, 4, 5, 8, 9, 12, 13, and 14, and a binary "0" in stage 17, said row will be characterized as predetermined binary word 1 notwithstanding the contents of the remaining stages of the row. Similarly, if a row includes a binary "1" in each of stages 3 and 14, notwithstanding the contents of the remaining stages, the examined row is characterized as predetermined binary word 4. Consequently, it is appreciated that a row of binary signals may be characterized by word detecting means 16 as more than one predetermined binary word. Nevertheless, this apparent ambiguity is exploited by sequence detecting means 18 which, in combination with word detecting means 16, minimizes the number of predetermined binary words that must be stored in word storage means 17 and to which the content of each row in storage means 13 must be compared. Consequently, the total number of characteristic features that, in combination, represent the alphanumeric characters to be identified, may be kept at a minimum.

IDENTIFYING A CHARACTERIZATION SEQUENCE

Figure 7B:
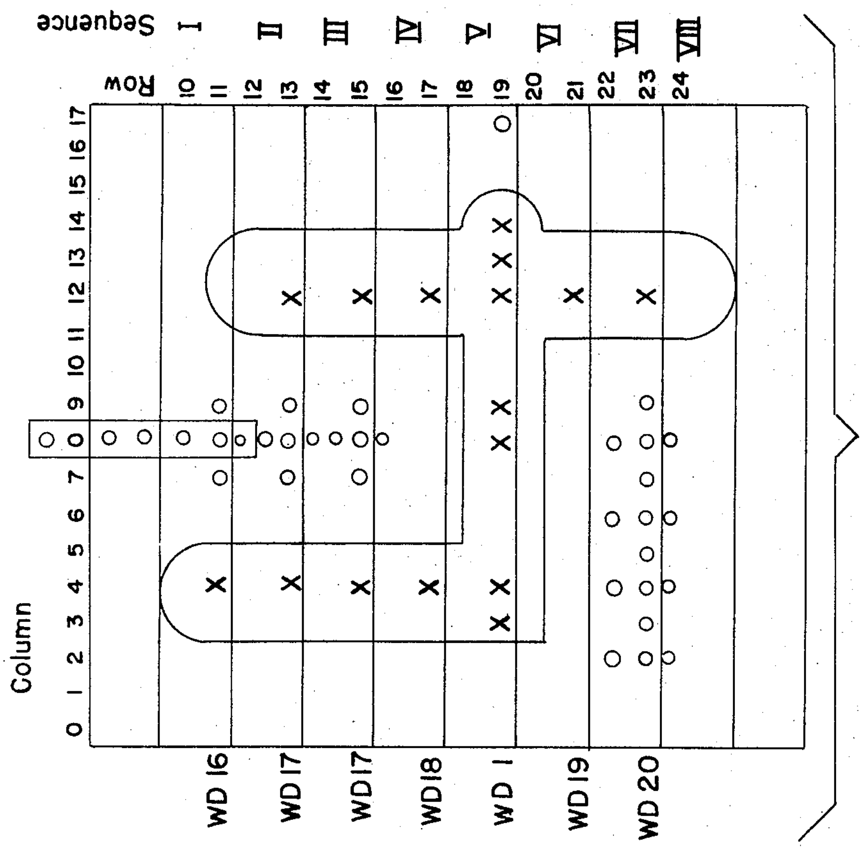
FIGS. 7A and 7B schematically illustrate some of the typical data words that are utilized in the present invention to represent discrete portions of known character patterns.
Figure 7A:
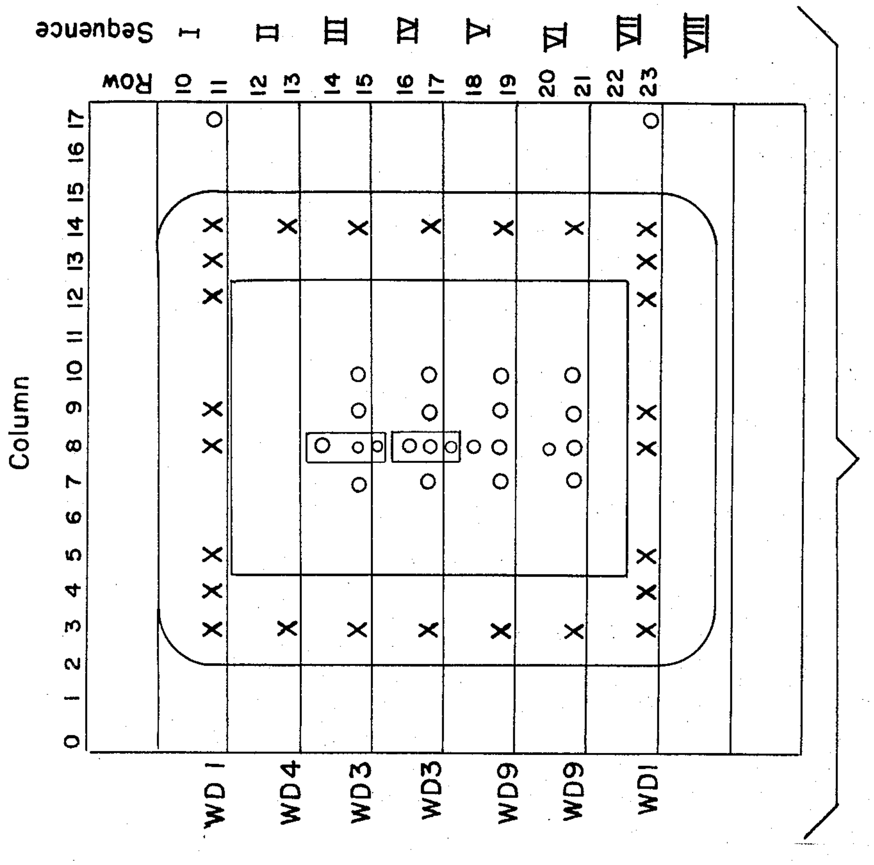

Let it be assumed that the character recognition system illustratively embodied in the apparatus of FIG. 1 is capable of recognizing 15 alphanumeric characters. Let if further be assumed that 48 predetermined binary words may be stored in word storage means 17, each of which predetermined binary words represents a characteristic feature of at least one of the 15 alphanumeric characters. It will be additionally assumed that a data field geometric configuration of the type illustrated in FIG. 7A represents the geometric pattern of a presented character 10. Thus, rows 11–23 of FIG. 7A may represent the information content of rows 11–23 of one or more of the registers included in storage means 13. For example, row 11 of FIG. 7A may represent the contents of row 11 in the normal register, row 13 of FIG. 7A may represent the contents of row 13 in both the thick register and the normal register, row 15 may represent the contents of row 15 of the thick register, row 17 may represent the contents of row 17 of the thin register, and so on. When word detecting means 16 examines the contents of row 11, for example, in each of the thick, normal and thin registers, row 11 in at least one of said registers will be characterized as predetermined binary word 1. It is apparent that word detecting means 16 will likewise characterize row 11 as predetermined binary word 4. Sequence detecting means 18, which for the presently assumed example may store 15 unique sequences corresponding to the 15 known alpha-numeric characters to be recognized, will thus compare the ensuing sequence of characterizations with those stored sequences commencing with predetermined binary word 1 or predetermined binary word 4. Word detecting means 16 is next sequentially adapted to examine the contents of row 13. It will be assumed that the contents of row 13 stored in the thick register are characterized as predetermined binary word 4 and, because of irregularities such as smudges, blemishes, or the like, row 13 in the normal register may be characterized, for example, as predetermined binary word 8. The possible sequences to which the developing sequence of characterizations may now be compared are those sequences commencing with predetermined binary words 1, 4; 1,8; 4,4; and 4,8.

Word detecting means 16 next examines row 15 in each of the registers. As is apparent from FIG. 7A, and as will be appreciated from the forthcoming detailed description of word detecting means 16, the contents of row 15 may be combined with the contents of rows 14 and 16 to characterize said row as a predetermined binary word. Thus, if stages 3 and 14 of row 15 each contain a binary "1" and stages 7–10 of row 15 as well as stage 8 of each of rows 14 and 16 each contain a binary "0" the contents of row 15 may be characterized as predetermined binary word 3. However, as will soon be seen, a characterization of a row as predetermined binary word 3 requires a simultaneous characterization of said row as predetermined binary word 9. The following sequences of characterization are thus developed by word detecting means 16 and are compared by sequence detecting means 18 to each of the predetermined stored sequences: 1,4,3; 1,4,9; 1,8,3; 1,8,9; 4,4,3; 4,4,9; 4,8,3; and 4,8,9. To simplify the present discussion let it be assumed that none of the known alphanumeric characters may be represented by a sequence commencing with the predetermined binary words: 1,4,9; 1,8,9; 4,4,3; 4,4,9; or 4,8,9. Row 17 in each of the registers is next examined by word detecting means 16. The contents of row 17 included in the normal register may be characterized as predetermined binary word 3 which, it is recalled, results in a simultaneous characterization of said row as predetermined binary word 9. Let it be assumed that, because of some irregularity in the presented character or background upon which said presented character is contrasted, the contents of row 17 in the thin register are characterized as binary word 19. Further assume that none of the stored sequences commence with predetermined binary words: 1,4,3,9; 1,8,3,3; 1,8,3,9; 4,8,3,3; 4,8,3,9; or 4,8,3,19. The predetermined sequences stored in sequence detecting means 18 are compared with the following developing sequences comprised of predetermined binary words: 1,4,3,3; 1,4,3,19; or 1,8,3,19. The contents of row 19 of each register included in storage means 13 are next examined by word detecting means 16. During the examination of row 19, a portion of the contents of rows 18 and 20 are sensed; accordingly, row 19 may be characterized as both predetermined binary word 9 and predetermined binary word 3. The developing sequences that may now be compared by sequence detecting means 18 with the stored predetermind sequences are comprised of binary words: 1,4,3,3,9; 1,4,3,3,3; 1,4,3,19,9; 1,4,3,19,3; 1,8,3,19,9; and 1,8,3,19,3. Word detecting means 16 next examines the contents of row 21 in each register included in storage means 13. Let it be assumed that, because of nonuniformities in the stroke of the presented character, only row 21 included in the thin register may be validly identified. Accordingly, row 21 may be characterized as predetermined binary word 9. Sequence detecting means 18 may now compare the predetermined sequences stored therein to the following developing sequences comprised of predetermined binary words: 1,4,3,3,9,9; 1,4,3,3,3,9 (to which no stored sequence corresponds); 1,4,3,19,9,9 (to which no stored sequence corresponds); 1,4,3,19,3,9; 1,8,3,19,9,9; and 1,8,3,19,3,9 (to which no stored sequence corresponds). Word detecting means 16 now examines the contents of row 23 in each register in storage means 13. In view of the binary signals stored in the various stages in row 23, it is appreciated that row 23, in at least one of the thick, normal or thin registers, may be characterized as predetermined binary word 1 and predetermined binary word 4. Hence, the possible sequences that are now presented to sequence detecting means 18 are comprised of predetermined binary words: 1,4,3,3,9,9,1; 1,4,3,3,9,9,4; 1,4,3,19,3,9,1; 1,4,3,19,3,9,4; 1,8,3,19,9,9,1; and 1,8,3,19,9,9,4. Of the characterization sequences presented to sequence detecting means 18, only the first mentioned sequence finds correspondence in any of the stored predetermined sequences. Consequently, the presented character 10 is identified as that alphanumeric character that may be represented by the sequence of predetermined binary words 1,4,3,3,9,9,1. The presented character is thus identified as the alphanumeric character "0."

An output terminal of sequence detecting means 18 associated with the alphanumeric character "0" is thus energized and an appropriate signal is supplied to a corresponding input terminal of encoding means 19. A binary coded representation of the presented character may now be transmitted by encoding means 19 to further apparatus, not shown.

If it is assumed that more than one of the developed sequences presented to sequence detecting means 18 finds correspondence in the stored predetermined sequences therein, error detecting means 20 senses the energization of more than one output terminal of sequence detecting means 18 to thereby indicate an error in recognition of the presented character and to disable the operation of encoding means 19. Similarly, if none of the developed sequences presented to sequence detecting means 18 finds corespondence with a stored predetermined sequence therein, error detecting means 20 senses the failure of an output terminal of sequence detecting means 18 to be energized and provides a suitable error indication to apprise an operator thereof.

Although word detecting means 16 is described in detail further hereinbelow with reference to FIG. 4, it should be appreciated that any suitable gating network may be employed to detect the contents of selected stages in successive rows in each of the registers included in storage means 13. Furthermore, the contents of a given row in each of the registers in storage means 13 may be compared in sequence to each predetermined binary word stored in word storage means 17. Alternatively, word detecting means 16 may comprise any suitable content addressable memory of the type well known in the art wherein the contents of a given row of a register in storage means 13 are simultaneously compared to each predetermined binary word stored in word storage means 17, and the results of such comparison are applied to sequence detecting means 18. Additionally, word detecting means 16 may comprise conventional apparatus capable of correlating the contents of a row included in the registers in storage means 13 with predetermined binary words and indicating the results of such correlation.

Sequence detecting means 18 may comprise conventional storage apparatus capable of storing each developing characterization sequence effected by word detecting means 16 and of comparing each developing sequence with predetermined sequences stored therein. An alternative embodiment of sequence detecting means 18 is described in detail hereinbelow with reference to FIG. 5.

It should now be readily apparent from the foregoing description of the manner in which a given row and portions of immediately succeeding and preceding rows is examined, that the present invention admits of a wide versatility and is not limited merely to the examination of linear, uniform discrete areas of a scanned pattern. On the contrary, the information content of discrete areas having relevant characteristic features is detected by word detecting means 16 in accordance with the present invention.

STORAGE

A detailed description of an exemplary embodiment of the construction of the various component parts of the character recognition system illustrated in FIG. 1 will now be described. Referring first to FIG. 2 there is illustrated block diagram of storage means 13 and character positioning means 14. Storage means 13 is illustrated as being comprised of register 131, identified as the Q2 register, together with additional registers 151 and 152, identified as the Q1 and the Q3 registers, respectively. The Q1, Q2 and Q3 registers are each capable of storing nm binary signals and each are arranged as an nxm array having n rows and *m* columns. In each register, the first element of a column is connected to the n-th element of an adjacent column. Moreover, the n-th element of the m-th column in each of the Q1, Q2 and Q3 registers is connected to a corresponding terminal of multi-level quantizing means 12'. In the embodiment illustrated herein, it is recognized that each register is capable of serially receiving quantized binary signals applied thereto and to serially shift said signals through the nm stages therein. Consequently, each register may be comprised of m shift registers, each of which m shift registers includes n individual stages therein. Hence, when one shift register is filled, the contents thereof are serially shifted to the next shift register and so on until the entire Q1, Q2 and Q3 registers are filled. The nxm array permits each register to store therein a weighted data field geometric configuration formed of binary signals and being in approximate conformity with the geometric configuration of the presented character.

Each of Q1, Q2 and Q3 registers includes a timing input terminal to which is supplied shift pulses capable of effecting the shifting of binary signals therethrough. A timing circuit 132 supplies shift pulses simultaneously to each of Q1, Q2 and Q3 registers at a frequency equal to *nf*, wherein n is equal to the number of rows included in each register and f is the frequency at which a column of binary signals is supplied to a register. It should also be apparent that the period 1/*f* is equal to the time required to scan an entire column of discrete area elements by scanning means 11. Timing circuit 132 may comprise a conventional astable multivibrator admitting of a precise and stable frequency of operation.

It is recalled that the multi-level quantizing means is capable of producing three discrete binary signals in response to a derived voltage supplied thereto by scanning means 11. The state of the signal produced at each output terminal of the multi-level quantizing means is, therefore, dependent upon the relative magnitude of the voltage produced by scanning means 11 with respect to each of the discrete quantizing levels at which the multi-level quantizing means operates. Accordingly, the Q1 register receives binary signals that represent the relation between the voltages produced by scanning means 11 and a first quantizing level, register Q2 receives binary signals that represent the relation between the voltages produced by scanning means 11 and a second quantizing level, said second quantizing level being less than said first quantizing level and register Q3 receives binary signals representing the relationship between the voltages produced by scanning means 11 and a third quantizing level, said third quantizing level being less than said second quantizing level. As the respective binary signals are shifted into and through each of the Q1, Q2 and Q3 registers, it may be appreciated that the binary signals are thus arranged in rows and columns to develop weighted data field geometric configurations that are in approximate conformity with the geometric configuration of the presented character. More particularly, a field array is developed in the Q1 register to represent a normalized character formed of relatively thick strokes. Similarly, a field array is developed in the Q2 register to represent a character formed of relatively normal strokes. And a field array is developed in the Q3 register to represent a normalized character formed of relatively thin strokes.

For the purpose of explanation it will be assumed that a binary "1" represents a voltage derived by scanning means 11 in reponse to the scanning of a character stroke element. Thus, if scanning means 11 is capable of optically scanning a black character contrasted against a white background, for example, a binary "1" represents a sensed black element and a binary "0" represents a sensed white element. Similarly, if scanning means 11 is capable of inductively scanning a character formed of a magnetic ink, a binary "1" represents a voltage derived by the scanning means when a magnetic element is sensed and a binary "0" represents a voltage derived by the scanning means when a non-magnetic or background element is sensed. If a particular row of a register, for example, the Q2 register, is considered, it may be recognized that as the binary signals are serially shifted into and through the Q2 register each binary signal will eventually be shifted through each stage in the given row. More particularly, if the *j-th* row is considered it may be observed that the first binary signal produced by scanning means 11 is shifted into the *j-th* stage of the *m-th* column when the Q2 register is initially supplied with binary signals. After the m-th column is fully loaded, that is, when the initially supplied binary signal is shifted into the first stage thereof, the initial binary signal will be shifted into the *n-th* stage of the (*m*-1)-*th* column; and at the time the initial binary signal is shifted into the *j-th* stage of the (*m*-1)*th* column, the first binary signal of the next succeeding column is shifted into the *j-th* stage of the *m-th* column. As binary signals are serially supplied to the Q2 register, it is appreciated that the *j-th* stage of each of the m columns will, at some point in time, be loaded with the first binary signal of each column. At a period of time 1/*nf* later, the second binary signal in each column will be shifted simultaneously into the *j-th* row. Similarly, at the next period of time 1/*nf* the third binary signal included in each column will be shifted simultaneously into the *j-th* row. Thus, as the Q2 register receives binary signals serially supplied thereto by the multi-level quantizing means, a data field geometric configuration will be shifted through the register on a row by row basis as well as a column by column basis. A representation of the presented character may therefore be sequentially examined as the data field geometric configuration is shifted through the Q2 register by sampling the contents of a given row of stages.

CHARACTER POSITIONING

Turning now to the logic diagram of FIG. 2 wherein character positioning means 14 is illustrated, the character positioning means comprises flip-flop means 142, one-shot means 143, counter means 144, flip-flop means 147, flip-flop means 148 and flip-flop means 149. The character positioning means is coupled to the Q2 register and is adapted to monitor a particular column of stages therein to sense the initial occurrence of a binary "1" therein. The character positioning means may be coupled to either the Q1 or Q3 registers if so desired; however, it is preferred to couple the character positioning means to the Q2 register because the data field geometric configuration stored in the Q2 register is not normalized.

Flip-flop means 142 may comprise a conventional bistable multivibrator circuit, such as an R-S flip-flop, a J-K flip-flop or the like, having set and reset input terminals and one and zero output terminals. A signal such as a binary "1" supplied to the set input terminal thereof is adapted to set the flip-flop means to its first state, characterized by a signal, such as a binary "1," at the one output terminal thereof. Similarly, a signal such a binary "1" supplied to the reset input terminal thereof is adapted to reset the flip-flop means to its second state, characterized by a signal, such as a binary "0," at the one output terminal thereof and a binary "1" at the zero output terminal thereof. The flip-flop means is capable of remaining in its first or second state until being reset or set, respectively, by an appropriate input signal. The set input terminal of flip-flop means 142 is coupled to an appropriate stage in a centrally disposed column of the Q2 register. Although flip-flop means 142 may be coupled to any stage included within the centrally disposed column, it is convenient to couple the set input terminal thereof to the first stage of said column. Although the total number of columns included in the Q2 register (as well as the Q1 and Q3 registers) may be any suitable number m, it may be assumed, for the purpose of explanation, that the width of a presented character of a given font does not exceed 12 scan lines. Accordingly, to permit adequate recognition of various fonts and to account for intercharacter spacing, m may be equal to 18. The columns of the Q2 register (as well as the Q1 and Q3 registers) may be designated 0–17. a centrally disposed column may, therefore, be designated column 9. The set input terminal of flip-flop means 142 is thus coupled to the first stage of column 9 of the Q2 register via AND gate 141. AND gate 141 includes a second input terminal coupled to the first stage of column 10 of the Q2 register to provide a degree of assurance that the detection of an initial binary "1" is derived from a scanned character stroke and is not attributed to the sensing of dirt or other irregularities in the presented character 10. As is well known to those of ordinary skill in the art, an AND gate is capable of providing a signal at an output terminal whereof when all of the input terminals thereof are supplied with a corresponding signal. Thus, AND gate 141 is capable of applying a binary "1" to the set input terminal of flip-flop means 142 when both input terminals of the AND gate are each provided with a binary "1."

The reset input terminal of flip-flop means 142 is coupled to clock generator 145. The clock generator is capable of generating relatively narrow clock pulses of a frequency *f*. It may be observed that timing circuit 132 generates timing pulses of a frequency that exceeds the frequency of the clock pulses generated by clock generator 145 by a magnitude of *n*. Thus, it should be realized that clock generator 145 generates a clock pulse when a column of stages in the Q1, Q2 and Q3 registers has been filled with serially supplied binary signals. The frequency of the clock pulses produced by the clock generator is therefore equal to the rate at which the columns of the registers are loaded. Stated otherwise, the frequency of the pulses generated by the clock generator is equal to the columnar scanning rate at which scanning means 11 scans the presented character 10.

The one output terminal of flip-flop means 142 is coupled to one-shot means 143. The one-shot means may comprise a conventional monostable multivibrator, uni-junction transistor circuit, Schmitt trigger circuit, or the like, capable of sensing a negative transition in the signal applied to the input terminal thereof to produce a pulse of determined width. The output terminal of one-shot means 143 is coupled to an enabling input terminal of counter means 144. The counter means may comprise a conventional binary counting circuit adapted to count the pulses applied to an input terminal thereof and to register the count attained thereby. Counting means 144 is coupled to clock generator 145 and is capable of incrementing the count thereof in response to applied clock pulses. As illustrated herein, counting means 144 is coupled to clock generator 145 by a wellknown freqeuncy dividing circuit 146 which functions to halve the frequency of the pulses supplied to counting means 144 by the clock generator. it is well understood that dividing circuit 146 may be combined with counting means 144 to form a conventional counting circuit. A first output terminal of counting means 144 is coupled to a set input terminal of flip-flop means 147 and is adapted to supply a pulse thereto when a first predetermined number of clock pulses are generated by clock generator 145. A second output terminal of counting means 144 is coupled to the reset input terminal of flip-flop means 147 and is adapted to supply a signal thereto when a second predetermined number of clock pulses have been generated by clock generator 145. Flip-flop means 147, which is similar to aforedescribed flip-flop means 142, includes one and zero output terminals coupled to further apparatus described hereinbelow with respect to FIGS. 5 and 6. It may be observed that the reset input terminal of flip-flop means 147 is coupled to the second output terminal of counting means 144 via OR circuit 150. The OR circuit is a conventional logic element capable of providing a signal at an output terminal thereof when any of the input terminals thereof is supplied with a corresponding signal.

A second input terminal of OR circuit 150 is coupled to flip-flop means 149, the latter circuit including a timing pulse input terminal and being adapted to be set or reset to first and second states, respectively, in accordance with the signal applied to the set input terminal thereof, if said applied signal coincides with a signal applied to the timing pulse input terminal thereof. Flip-flop means 149 may thus be a conventional gated bistable multivibrator circuit. The set input terminal of flip-flop means 149 is coupled to the zero output terminal of flip-flop means 148. Flip-flop means 148 is similar to aforedescribed flip-flop means 142 and includes a reset input terminal coupled to clock generator 145 via delay circuit 145'. In addition, a set input terminal of flip-flop means 148 is coupled to a predetermined column in the Q2 register. Clock generator 145 is further coupled to the timing pulse input terminal of flip-flop means 149. As will soon become apparent, flip-flop means 148 is adapted to detect a trailing portion of the scanned character 10. For the purpose of explanation, it may be assumed that the set input terminal of flip-flop means 148 is coupled to the first stage of column 13 in the Q2 register.

DETERMINING WHEN AN ENTIRE CHARACTER IS SCANNED

The operation of the apparatus illustrated in FIG. 2 will now be described. Initially, the Q1, Q2 and Q3 registers are empty. When a scanning operation commences, multi-level quantizing means 12' supplies each of the Q1, Q2 and Q3 registers with serial binary signals representing the relative magnitudes of the sequence of voltages produced by scanning means 11 as a longitudinal area of presented character 10 is scanned. The binary signals are applied to the Q1, Q2 and Q3 registers at a frequency nf and are serially shifted through said registers at the nf frequency. After the first longitudinal area of presented character 10 has been scanned by scanning means 11, column 17 of each of the Q1, Q2 and Q3 registers will have stored therein n binary signals. At that time a pulse will be generated by clock generator 145. As succeeding longitudinal areas of the presented character are scanned, binary signals representing each scanned longitudinal area will be serially shifted into the Q1, Q2 and Q3 registers; and when each succeeding column is filled with binary signals, clock generator 145 will generate a clock pulse. It may be appreciated that while the Q1, Q2 and Q3 registers are initially loaded, flip-flop means 142, 147 and 148 each admit of their respective second state and flip-flop means 149 admits of its first state. When a stroke of the presented character 10 is initially scanned, the column of binary signals that is then serially supplied to the Q1, Q2 and Q3 registers will include at least one binary "1" therein. This column of binary signals is eventually shifted to column 13 and a binary "1" will thus be shifted into and through the first stage of column 13. At that time, flip-flop means 148 will be set to its first state and a binary "0" will be applied thereby to flip-flop means 149. When a clock pulse is generated by clock generator 145, the clock pulse is applied to the timing pulse input terminal of flip-flop means 149 to reset the flip-flop means to its second state. At a delayed time subsequent thereto, the clock pulse is applied to the reset input terminal of flip-flop means 148. Hence, flip-flop means 148 is now reset to its second state and flip-flop means 149 is also reset to its second state. The latter flip-flop means now applies a binary "0" to OR circuit 150. Since flip-flop means 147 has not been heretofore supplied with a signal at the set input terminal thereof, the flip-flop means maintains its second state.

As each column of binary signals is serially shifted to an adjacent column, the binary "1" that was previously stored in column 13 will eventually be shifted into the first stage of column 10. As the last binary signal is shifted from the first stage of column 10 to the *n-th* stage of column 9 a clock pulse is generated by clock generator 145. When the first derived binary "1" is stored in the first stage of column 9 a binary "1" will be stored in the first stage of column 10 if a true character stroke was scanned. AND gate 141 is activated to thereby set flip-flop means 142 to its first state. It may be appreciated that if dirt or an irregularity had been scanned, it is highly improbable that a binary "1" would be stored in the first stages of both columns 9 and 10; and AND gate 141 will not be energized. When the contents of column 9 are shifted to an adjacent column, clock generator 145 generates a clock pulse that is applied to the reset input terminal of flip-flop means 142 to reset the flip-flop means. A negative transition is thus provided at the one output terminal of flip-flop means 142 to trigger one-shot means 143 whereby a pulse is applied to the enabling terminal of counting means 144.

Counting means 144, upon being enabled, increments the count exhibited thereby in response to pulses applied thereto. A first count is obtained by the counting means when a first predetermined number of clock pulses is generated by clock generator 145. For the purpose of explanation, it may be assumed that a signal is applied to the set input terminal of flip-flop means 147 by counting means 144 when a count corresponding to the generation of six clock pulses is attained by the counting means. It may be appreciated, therefore, that if counting means 144 is coupled to clock generator 145 via dividing circuit 146, a count of 3 is produced by the counting means when clock generator 145 has generated six clock pulses. If dividing circuit 146 is omitted, flip-flop means 147 is set to its first state when counting means 144 attains a count of 6. One of ordinary skill in the art will therefore appreciate that dividing circuit 146 is provided merely to simplify the construction of counting means 144. More particular, the presence of dividing circuit 146 serves to reduce the number of stages included in counting means 144.

It is recognized that flip-flop means 147 is set to its first state when clock generator 145 has generated six clock pulses subsequent to the setting of flip-flop means 142 to its respective first state. Consequently, the first derived binary "1" that had been previously stored in column 9 in the Q2 register is now stored in column 3 therein. More particularly, flip-flop means 147 is set to its first state when the binary representation of the leading edge of a scanned character is shifted into column 3. It is recalled that the maximum width of a presented character to be recognized by the apparatus of the present invention is assumed, for the present example, to not exceed a width corresponding to 12 columns. Of course any convenient width may be exhibited by a presented character in accordance with the font form which it is derived. Hence, the present example of 12 columns is not to be considered as a limitation to the scope of the instant disclosure. When flip-flop means 147 is set to its first state a signal is provided at the one output terminal thereof representing that an entire data field geometric configuration has been shifted into the Q2 register and, in addition, the data field geometric configuration is centered therein. It is thus appreciated that counting means 144 is enabled to commence the operation thereof when a binary representation of the leading edge of a scanned character is shifted into the approximate center portion of the Q2 register and flip-flop means 147 is set to its first state when the binary representation of the leading portion of the scanned character is shifted to a further portion in the Q2 register, said further portion being displaced from said center portion by an amount that corresponds to approximately one half the width of the scanned character.

It may be assumed that for most characters scanned by scanning means 11, the centering of the data field geometric configuration in the Q2 register will result in a binary "1" that is included in at least one of the stages in column 13. When said binary "1" is shifted into the first stage of column 13, flip-flop means 148 is set to its first state and a binary "0" is applied thereby to flip-flop means 149. A clock pulse will be applied to the timing pulse input terminal of flip-flop means 149 by clock generator 145 when the contents of column 13 are shifted into succeeding column 12, resulting in the maintenance of flip-flop means 149 in its second state as long as a representation of a character stroke is stored in column 13. Delay means 145' permits flip-flop means 148 to be reset after flip-flop means 149 responds to the signal supplied thereto. After a trailing portion of the scanned character is shifted out of column 13, that column will no longer store a binary "1." Consequently, flip-flop means 148, after being reset by the delayed application of a clock pulse thereto, remains reset in its second state. At the occurrence of the immediately succeeding clock pulse, the binary "1" applied to flip-flop means 149 by the zero output terminal of flip-flop means 148 is effective to set flip-flop means 149 to its first state. Thus, flip-flop means 149 assumes its first state after the trailing portion of a scanned character is sensed to apply a binary "1" to the reset input terminal of flip-flop means 147 via OR circuit 150. Flip-flop means 147 is thus reset to its second state, resulting in a pulse at the one output terminal thereof that admits of a duration not less than 2 clock pulse periods, for example. It is recognized that flip-flop means 147 remains set in its first state for a number of clock pulse periods dependent upon the actual width of a scanned character. The function of flip-flop means 148 and 149 is to assure that flip-flop means 147 admits of the proper state in preparation for determining when a subsequent data field geometric configuration is centered within the Q2 register. Nevertheless, flip-flop means 148 and 149 may be omitted without reducing the effectiveness of the character positioning means from subsequently determining the proper positioning of a data field geometric configuration within the Q2 register. This obtains as a result of the output signal produced by counting means 144 at the second output terminal thereof and supplied to the reset input terminal of flip-flop means 147. More particularly, the counting means produces a signal at the second output terminal thereof when a second predetermined number of clock pulses have been generated by clock generator 145. For the purpose of explanation, it will be assumed that when eight clock pulses have been generated subsequent to the setting of flip-flop means 147 to its first state, counting means 144 is incremented to a second predetermined count whereby an output signal is applied thereby to the reset input terminal of flip-flop means 147. The resetting of flip-flop means 147 by counting means 144 is provided for the possibility that scanned dirt or other irregularities does not permit the resetting of flip-flop means 149 even after the trailing portion of a scanned character is shifted out of the Q2 register.

In summary, it may be appreciated, that counting means 144, once enabled by one-shot means 143, is responsive to 14 consecutive clock pulses generated by clock generator 145. Thus, when the sixth clock pulse is generated, counting means 144 is incremented to a first predetermined count, whereupon an output signal is produced at the first output terminal thereof. Eight clock pulses later, that is, when the clock pulse generator has generated its fourteenth clock pulse subsequent to the enabling of the counting means, counting means 144 is incremented to a second predetermined count whereupon an output signal is provided at the second output terminal thereof. Although not illustrated herein, a signal provided at the second output terminal of counting means 144 may be utilized by the counting means to reset the count thereof to an initial value. One of ordinary skill in the art may now recognize that if counting means 144 is coupled to clock generator 145 by dividing means 146, the counting means may be comprised of a conventional three-stage counter network. Alternatively, if the counting means is coupled directly to clock generator 145, the counting means may be comprised of a conventional four-stage counter network. Suitable gating means may be included within counting means 144 to detect when first and second predetermined counts are respectively attained thereby to provide the aforementioned output signals at the first and second output terminals thereof. Accordingly, flip-flop means 147 is reset to its second state subsequent to the proper positioning of a data field geometric configuration within the Q2 register to prepare the character positioning means 14 to sense the proper positioning of a subsequently developed data field geometric configuration.

TIME-DIVISION MULTIPLEXING OF THE Q1, Q2 AND Q3 REGISTERS

Figure 3:
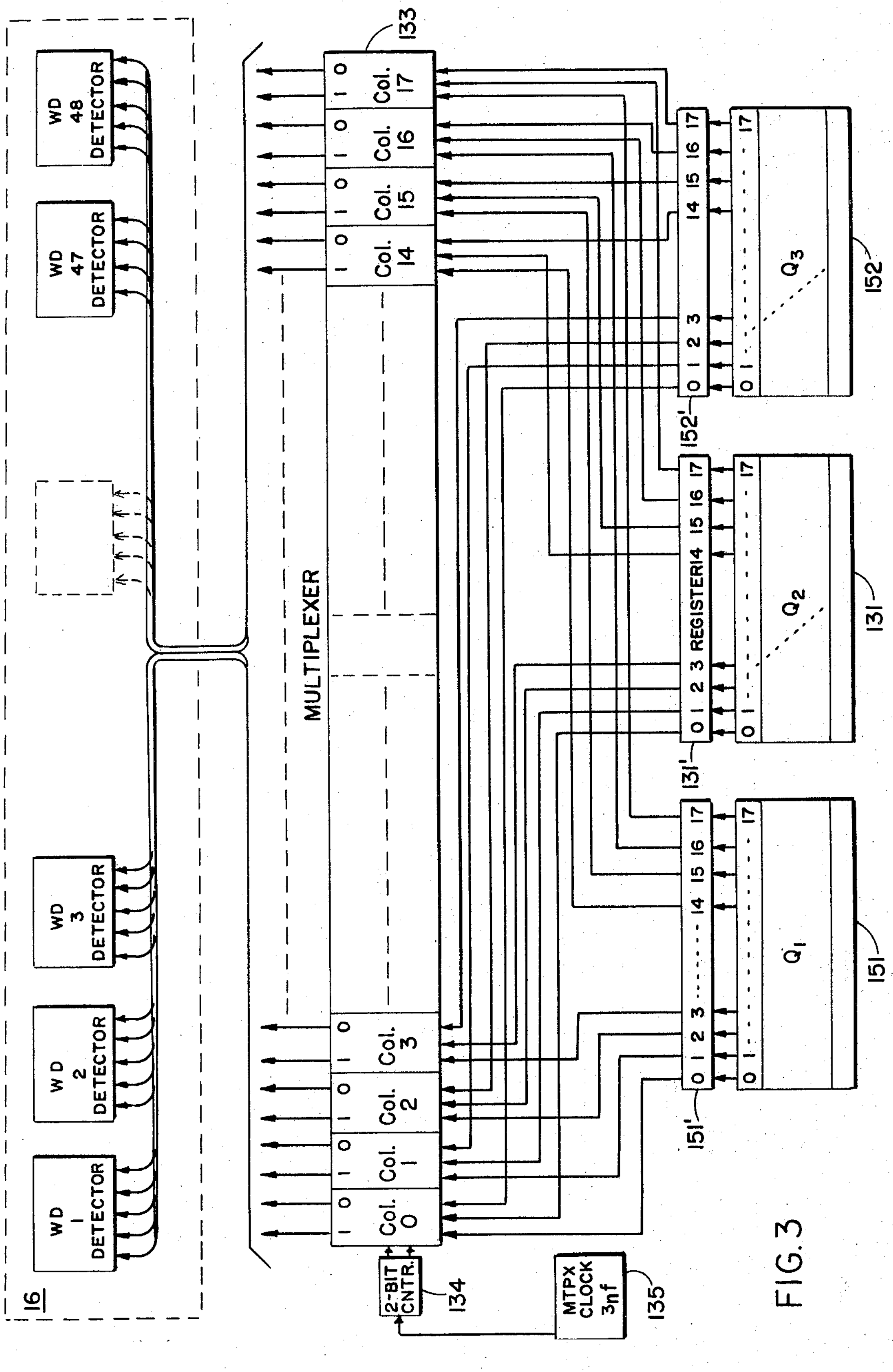
FIG. 3 is a block diagram illustrating the apparatus utilized in the present invention to compensate for nonuniformities in a presented character.

As will soon be described in detail, discrete areas of the data field geometric configurations stored in the Q1, Q2 and Q3 registers are successively examined by the word detecting means to characterize the information content of said examined areas. Moreover, each area corresponds to a row in a respective register and the examination of the information content thereof is performed in synchronism with the shifting of binary signals through the registers. Although redundant word detecting means may be coupled to each of the Q1, Q2 and Q3 registers to enable simultaneous examination of corresponding rows in each register, it is preferred to utilize a single word detecting means and to couple said word detecting means to each of the Q1, Q2 and Q3 registers in succession. The apparatus utilized to couple the word detecting means to each of the Q1, Q2 and Q3 registers is illustrated in FIG. 3 which comprises multiplexing means 133, counting means 134 and multiplex clock generator 135. The first row of the Q1 register 151 is coupled to multiplexing means 133 by a temporary storage register 151'. Similarly, the first row of each of Q2 register 131 and Q3 register 152 is coupled to multiplexing means 133 by temporary storage registers 131' and 152', respectively. Each temporary storage register may be considered as an additional row of the corresponding register to which it is coupled. The temporary registers 151', 131' and 152' may, therefore, be omitted if desired.

Multiplexing means 133 comprises a plurality of conventional switching means, such as gating networks, or the like, each of which includes plural input terminals and an output terminal. Each of said switching means is adapted to supply at the output terminal thereof, in time-division fashion, the plural signals applied to the input terminals thereof and thus to provide a signal transmission path between a selected one of said plural input terminals and said output terminal in response to a control signal applied to a control input terminal thereof. The plurality of switching means comprising multiplexing means 133 are disposed for parallel operation such that each control input terminal thereof is connected in common to counting means 134. Counting means 134 may comprise a conventional two-stage binary counter adapted to increment the count thereof in response to counting pulses supplied thereto by multiplex clock generator 135. In addition, counting means 134 is adapted to be reset to an initial count in response to attaining a predetermined count.

As illustrated herein, multiplexing means 133 includes a number of switching means equal to the number of stages included in a row of the Q1, Q2 or Q3 registers. Stage 1 of the Q1 register (or temporary storage register 151') is coupled to a first input terminal of the first switching means of multiplexing means 133, stage 1 of the Q2 register (or temporary storage register 131') is coupled to the second input terminal of the first switching means of multiplexing means 133 and stage 1 of the Q3 register (or temporary storage register 152') is coupled to the third input terminal of the first switching means of multiplexing means 133. Similarly, the second switching means of multiplexing means 133 includes input terminals coupled to the second stage of each of the Q1, Q2 and Q3 registers. Likewise, the *m-th* switching means of multiplexing means 133 includes input terminals coupled to the m-th stage of each of the Q1, Q2 and Q3 registers, respectively. For a purpose soon to become apparent, each of the switching means comprising multiplexing means 133 is here provided with complementary output terminals. Each of the switching means comprising multiplexing means 133 may thus correspond to a multiplexing circuit of the type designated Model 9309, manufactured by the Fairchild Semiconductor Corporation of Mountain View, California. Such multiplexing circuit is provided with four input terminals such that each circuit is capable of successively coupling the output terminal thereof to each of the four input terminals. Hence, use of such multiplexing circuit in the application provided herein may be readily adapted merely by providing a suitable matching circuit to the fourth input terminal thereof.

In operation, the binary signals stored in each stage of temporary storage registers 151', 131' and 152' are simultaneously applied to corresponding input terminals of each of the switching means comprising multiplexing means 133. Multiplex clock generator 135 may comprise an astable multivibrator similar in design to timing circuit 132 illustrated in FIG. 2 and capable of providing multiplex clock signals at a frequency equal to 3nf. It is noted, therefore, that the multiplex clock signals generated by multiplex clock generator 135 exhibit a frequency that exceeds a frequency of the shift pulses produced by timing circuit 132 by a factor of three. Counting means 134, which is initially set to a predetermined count, increments the count exhibited thereby in response to each multiplex clock signal supplied thereto by multiplex clock generator 135. When the count means 134 is incremented to a count of, for example, 1, the m binary signals supplied to multiplexing means 133 by temporary storage register 151' are coupled to the output terminals of the multiplexing means. When the count exhibited by counting means 134 is incremented to a count of 2, the m binary signals applied to the input terminals of multiplexing means 133 by temporary storage register 131' are coupled to the output terminals of the multiplexing means. Similarly, when the count exhibited by counting means 134 is incremented to a count of 3, the m binary signals supplied to multiplexing means 133 by temporary storage register 152' are coupled to the output terminals of the multiplexing means. The next multiplex clock signal supplied to counting means 134 serves to reset the counting means to an initial count of one such that the m binary signals supplied to the multiplexing means 133 by temporary storage register 151' are again coupled to the output terminals of the multiplexing means. However, it should be noted that at this time, timing circuit 132 supplies each of the Q1, Q2 and Q3 registers with a shift pulse whereupon the contents of the first row of each register are shifted into the temporary storage registers 151', 131' and 152', respectively. Thus, the binary signals now provided at the output terminals of multiplexing means 133 are those binary signals of the immediately succeeding row of the Q1 register that have been shifted into temporary register 151'.

The advantage of providing multiplexing means 133 with complementary output terminals is that a direct representation of the contents of a row of binary signals may be provided thereat without the necessity of employing necessary inverting circuits and gating means.

It should now be readily appreciated that the relationship between the frequency of multiplex clock generator 135 and timing circuit 132 is such as to enable the contents of each of temporary registers 151', 131' and 152' to be successively coupled in time-division fashion to the output terminals of multiplexing means 133 intermittent the period for shifting the contents of the first row of each of the Q1, Q2 and Q3 registers into the associated temporary registers 151', 131', and 152', respectively. Thus, during the period required to shift the contents of one column to an adjacent column, the weighted data field geometric configurations stored in each of the Q1, Q2 and Q3 registers are supplied in time division fashion to the output terminals of multiplexing means 133.

WORD DETECTORS

Although various contemplated embodiments of word detecting means 16 of FIG. 1 have been suggested hereinabove, a detailed description of one such embodiment now follows. In the ensuing description, it may be assumed that word storage means 17 is comprised of a hard-wired memory and that word detecting means 16 serves to sample the information content of each row of the Q1, Q2 and Q3 registers as presented at the output terminals of multiplexing means 133, and to compare the sampled content with the hard-wired memory. Thus, word detecting means 16 may be comprised of a plurality of coincidence means each having plural input terminals coupled to selected output terminals of multiplexing means 133. An individual coincidence means is provided for each of the predetermined binary words that are utilized to characterize the various distinguishing features of those alphanumeric characters which the present invention is capable of identifying. In accordance with the previously assumed example wherein 48 predetermined binary words are utilized to represent the distinguishing features of 15 alphanumeric characters, 48 coincidence means may be coupled in parallel to multiplexing means 133. The individual coincidence means are adapted to sample successive rows of each weighted data field geometric configuration to determine a correspondence between the information content of each sampled row and a corresponding one of the predetermined binary words.

Figure 4A:
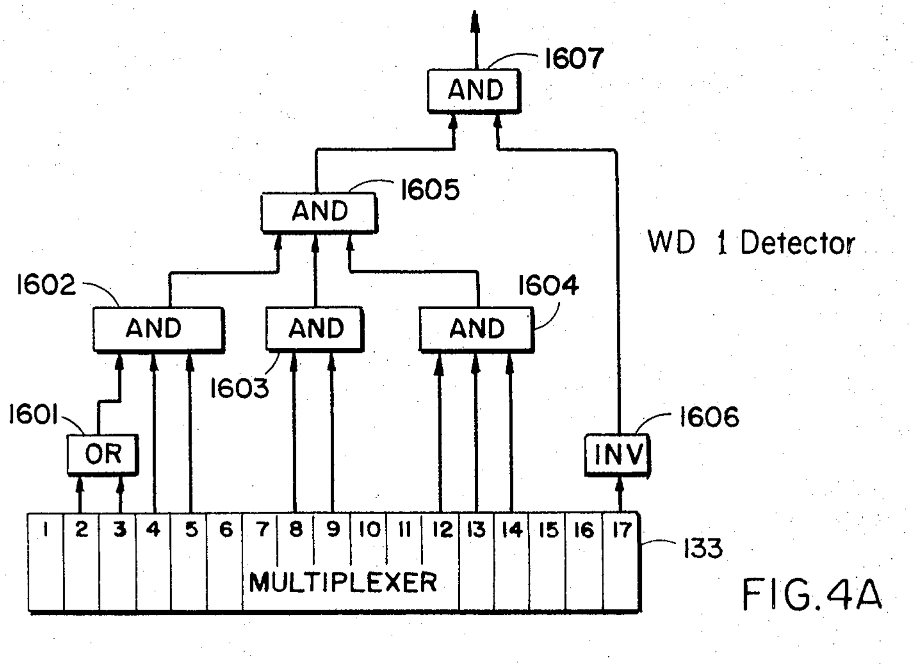
FIGS. 4A-4C are logic diagrams representing the construction of typical word detectors that may be included in the word detecting means illustrated in FIG. 1.
Figure 4B:
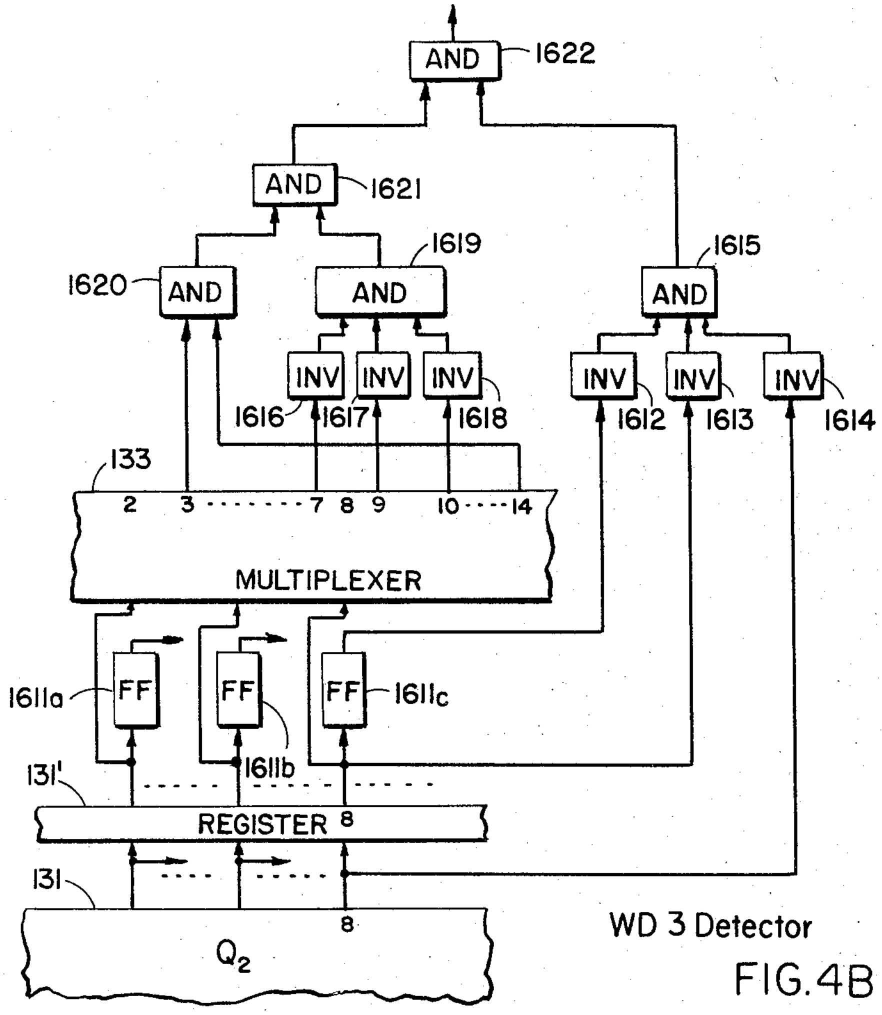
Figure 4C:
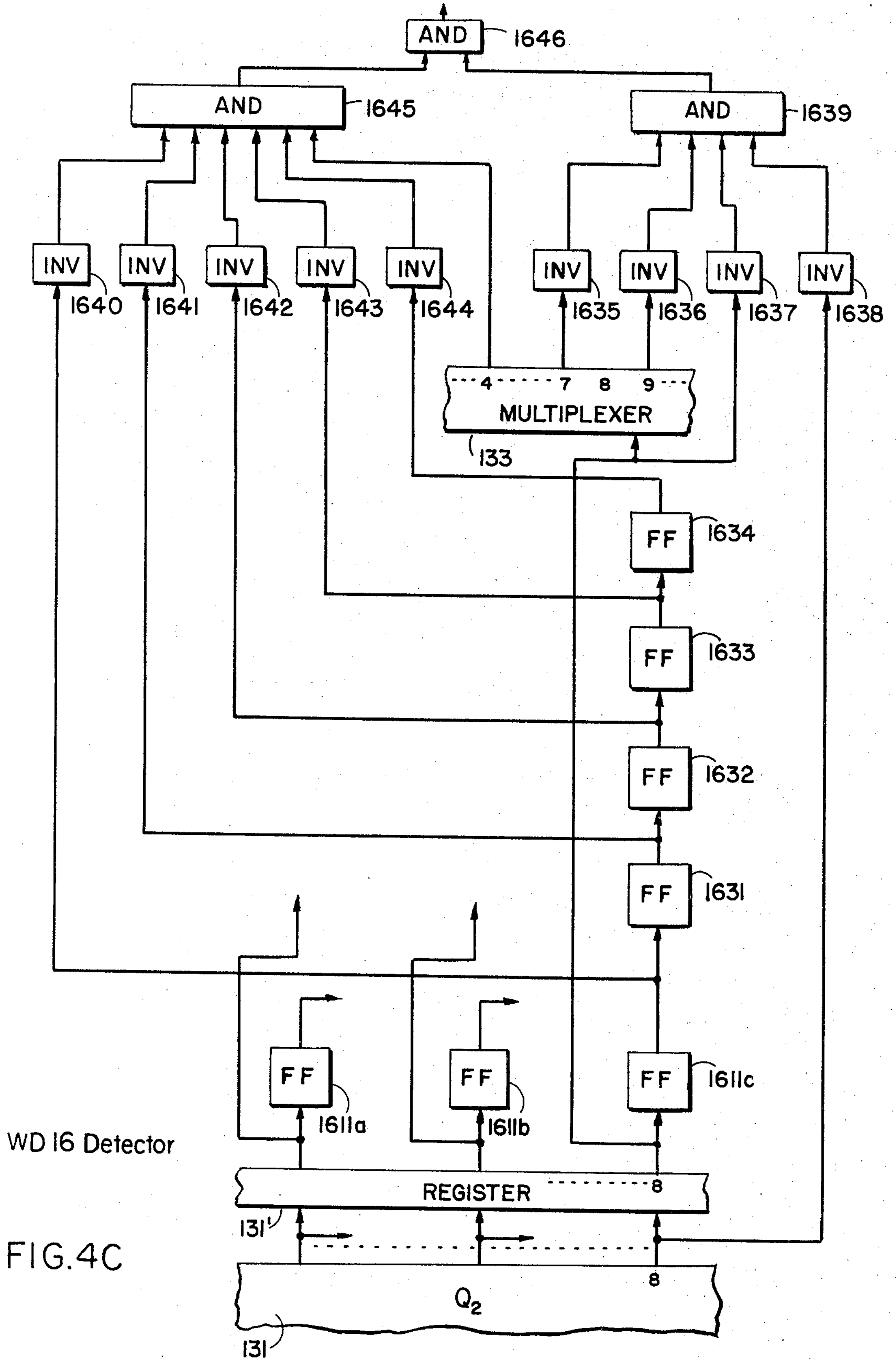

FIGS. 4A-4C are illustrative of typical coincidence means and the manner in which each of said typical coincidence means samples the information content of a stored row of binary signals. Referring now to FIG. 4A, a coincidence means capable of providing a correlation between the information content of a sampled row and predetermined binary word 1 is illustrated. The coincidence means, hereinafter referred to as the WD 1 DETECTOR, is adapted to detect when a binary "1" is stored in stages two or three, in stage four, in stage five, in stage eight, in stage nine, in stage 12, in stage 13 and in stage 14 and, in addition, a binary "0" is stored in stage 17 in a row in any of the Q1, Q2 or Q3 registers. Accordingly, a nine input AND gate may be provided having a first input terminal coupled to the one output terminal of switching means 2 or 3 of multiplexing means 133, a second input terminal coupled to the one output terminal of switching means 4, a third input terminal coupled to the one output terminal of switching means 5, a fourth input terminal coupled to the one output terminal of switching means 8, a fifth input terminal coupled to the one output terminal of switching means 9, a sixth input terminal coupled to the one output terminal of switching means 12, a seventh input terminal coupled to the one output terminal of switching means 13, an eighth input terminal coupled to the one output terminal of switching means 14 and a ninth input terminal coupled to the zero output terminal of switching means 17 of multiplexing means 133. It is recognized that if multiplexing means 133 is simultaneously provided with such binary signals at the noted output terminals thereof, notwithstanding the binary signals provided at the remaining output terminals thereof, the WD 1 DETECTOR is adapted to produce a signal, such as a binary "1," to thereby characterize the sampled row of the Q1, Q2 or Q3 register as predetermined binary word 1.

It is recognized that a nine input AND gate might not be readily available in the commercial market. Accordingly, the WD 1 DETECTOR is comprised of a plurality of commercially available AND gates to thereby synthesize a nine input AND gate. As illustrated in FIG. 4A, the WD 1 DETECTOR is comprised of OR circuit 1601 coupled to the output terminals of switching means 2 and 3 of multiplexing means 133 and including an output terminal coupled to an input terminal of AND gate 1602. Second and third input terminals of AND gate 1602 are coupled to the output terminals of switching means 4 and 5, respectively, of multiplexing means 133. A further AND gate 1603 includes first and second input terminals coupled to the output terminals of switching means 8 and 9 of the multiplexing means. Similarly, AND gate 1604 is provided with three input terminals coupled to the output terminals of switching means 12, 13 and 14 of multiplexing means 133. The output terminals of AND gates 1602, 1603 and 1604 are coupled to corresponding input terminals of AND gate 1605, the latter AND gate having an output terminal coupled to AND gate 1607. Another input terminal of AND gate 1607 may be coupled directly to the zero output terminal of switching means 17 of multiplexing means 133 or, in the alternative, may be coupled via inverting means 1606 to the one output terminal of switching means 17. Logical AND gates and inverting means are well known to those of ordinary skill in the prior art and further description thereof need not be provided.

WD 1 DETECTOR

The operation of the WD 1 DETECTOR will now be described with reference to FIG. 7A. It is recalled that as scanning means 11 traverses a scanning path across the presented character 10, binary signals are serially shifted into the Q1, Q2 and Q3 registers. As each binary signal is shifted therein, the contents of a column are serially shifted into an adjacent column. Thus, simultaneous with the forming of the weighted data field geometric configurations, the field arrays of binary signals are shifted through the Q1, Q2 and Q3 registers in a row by row manner. Thus, as each shift pulse is generated by timing circuit 132, the binary signals stored in the first row of the Q1, Q2 and Q3 registers are shifted into temporary storage registers 151', 131' and 152', respectively. Consequently, the signals stored in each of the temporary storage registers are successively provided at the output terminals of multiplexing means 133 in time-division fashion. As may be appreciated from an observation of FIG. 7A, when row 9, for example, of each weighted data field geometric configuration is shifted into the temporary storage registers, the binary signals provided at selected output terminals of multiplexing means 133 do not admit of a proper value to result in a binary "1" at the output terminal of AND gate 1607. Thus, the WD 1 DETECTOR does not indicate a favorable comparison with the row 9 binary signals provided at the output terminals of multiplexing means 133, regardless of the particular transmission path that may be established within the multiplexing means. AND gate 1607 is not therefore energized when the multiplexing means is activated to couple the contents of temporary storage register 151' or temporary storage register 131' or temporary storage register 152' to the output terminals thereof.

As timing circuit 132 produces subsequent shift pulses, the contents of row 11 in each of the Q1, Q2 and Q3 registers will be advanced to the temporary storage registers 151', 131' and 152', respectively. When counting maans 134 exhibits a first count, the row of binary signals stored in temporary storage register 151' is coupled to the output terminals of multiplexing means 133. Let it be assumed, for the purpose of explanation, that as a result of nonuniformities in the presented character 10, the binary signals stored in temporary storage register 151' do not necessarily correspond to illustrated row 11 in FIG. 7A. Consequently, the selected signals applied to WD 1 DETECTOR might not admit of the necessary coinciding relationship. Row 11, originally stored in the Q1 register and now sampled by the WD 1 DETECTOR, is thus not characterized as binary word 1. It is noted, however, that each of the word detectors are connected in parallel and the binary signals stored in selected stages of temporary storage register 151' might admit of a further coinciding relationship such that row 11 of the Q1 register might be characterized as a further predetermined binary word. As will soon become apparent, a seemingly erroneous characterization of a row of one of the Q1, Q2 or Q3 registers will not affect the proper identification of the presented character, provided said row in one of the remaining registers is accurately characterized.

Let it be assumed that row 11 of the data field geometric configuration stored in the Q2 register includes therein, inter alia, binary signals in selected stages that correspond to the binary signals represented in row 11 of FIG. 7A. Thus, it may be assumed that stages 3, 4, 5, 8, 9, 12, 13 and 14 in row 11 of the Q2 register each have stored therein a binary "1" and stage 17 of row 11 has stored therein a binary "0", notwithstanding the contents of the remaining stages. Consequently, when row 11 of the Q2 register is advanced to temporary storage register 131', and when counting means 134 admits of its second count, the contents of temporary storage register 131' are coupled to the output terminals of multiplexing means 133 thereby providing a binary "1" at the input terminals of each of AND gates 1602, 1603 and 1604. Each of said AND gates produces a binary "1" in response to the input signals supplied thereto whereupon AND gate 1605 supplies AND gate 1607 with a binary "1." The logic negation performed upon the binary "0" stored in stage 17 of temporary storage register 131' by inverting means 1606 is effective to supply the other input terminal of AND gate 1607 with a binary "1." Consequently, the WD 1 DETECTOR produces a binary "1" at the output terminal of AND gate 1607, thereby characterizing row 11 in the Q2 register as predetermined binary word 1.

When counting means 134 is incremented to its third count, the contents of temporary storage register 152' are coupled to the output terminals of multiplexing means 133. Hence, if the binary signals stored in selected stages in temporary storage register 152' correspond to the binary signals represented in row 11 of FIG. 7A, row 11 of the Q3 register is characterized as predetermined binary word 1. However, if the selected binary signals stored in temporary storage register 152' do not admit of the coinciding relationship represented by the WD 1 DETECTOR of FIG. 4A, row 11 of the Q3 register may be characterized as some other predetermined binary word. Nevertheless, such characterization will not affect the proper identification of the presented character, as will soon become apparent from the detailed description set forth hereinbelow.

It is recognized that the next multiplex clock signal generated by multiplex clock generator 135 coincides with the next shift signal generated by timing circuit 132. Accordingly, row 12 of each of the Q1, Q2 and Q3 registers is thence shifted into temporary storage registers 151', 131' and 152', respectively. Additionally, counting means 134 is reset to its initial count whereupon the contents of temporary storage register 151' are again made available at the output terminals of multiplexing means 133. Thus, the contents of temporary storage register 151' are sampled by each of the parallel connected word detectors. Moreover, as the count exhibited by counting means 134 is successively incremented, the contents of the remaining temporary storage registers are similarly sampled by the parallel connected word detectors. In this manner, the contents of each row of the weighted data field geometric configurations are compared to the predetermined binary words such that the information content representative of discrete areas of the presented character 10, as scanned by scanning means 11, may be appropriately characterized.

When a suitable number of shift pulses are produced by timing circuit 132, row 13 in each of the Q1, Q2 and Q3 registers will be shifted into temporary storage registers 151', 131' and 152', respectively. If the binary signals stored in selected stages in any of the temporary storage registers admit of the proper coinciding relationship, the contents of said temporary register are characterized as one of the predetermined binary words. Thus, if a binary "1" (as represented by an "X" in FIG. 7A) is stored in stages 3 and 14, notwithstanding the binary signals stored in the remaining stages therein, in row 13 in any of the Q1, Q2 or Q3 registers, row 13 is characterized as binary word 4. it may be readily appreciated, therefore, that the WD 4 DETECTOR, not shown, may be implemented by a conventional AND gate having a first input terminal coupled to the output terminal of switching means 3 and a second input terminal coupled to the output terminal of switching means 14 of multiplexing means 133.

It has been found, during experimentation with apparatus incorporating the concepts of the present invention, that the characteristic features of alphanumeric characters, as represented by the predetermined binary words, need not be inflexibly limited to the configurations described hereinabove. More particularly, the characteristic feature represented by predetermined binary word 1 will be identified as such even if only one of stages 3, 4 and 5 of a row have a binary "1" stored therein. Similarly, a proper identification of this characteristic feature may be obtained if only one of stages 7 and 8 and one of stages 12, 13 and 14 of a row have a binary "1" stored therein. Consequently, the illustrated embodiment of the WD 1 DETECTOR may be modified whereby AND gates 1602, 1603 and 1604 may each be replaced by a conventional OR-circuit. Thus, significant deteriorations and mutations of a presented character might not impede the word detectors of the present invention from, nevertheless, properly recognizing the characteristic features of said character to thereby identify the presented character.

WD 3 DETECTOR

The word detectors as contemplated by the present invention admit of sufficient flexibility so as not to be limited to the examination of a discrete area of a scanned character that is represented solely by a scanned row. Stated otherwise, at least some of the word detectors are capable of recognizing characteristic features of alphanumeric characters, which characteristic features are formed of a given scanned row and portions of one or more adjacent and successive scanned rows. More particularly, and with reference to FIG. 7A, a discrete area of a data field geometric configuration may be characterized as, for example, predetermined binary word 3 if the information content of said discrete area corresponds to that represented by rows 14, 15, and 16. Thus, if a given row of one of the Q1, Q2 or Q3 registers includes a binary "1" stored in stages 3 and 14 and a binary "0" stored in stages 7, 8, 9 and 10 and if stage 8 of an immediately preceding row has a binary "0" stored therein and, in addition, if stage 8 of an immediately succeeding row has a binary "0" stored therein, then said given row is characterized as predetermined binary word 3. An implementation of the apparatus contemplated to sample a row of binary signals and to characterize said row as predetermined binary word 3 is illustrated in FIG. 4B. To permit the simultaneous storage of a given row and an immediately preceding row of binary signals to permit the proper sampling thereof, an additional row of flip-flop means is coupled to the output terminals of a corresponding temporary storage register. FIG. 4B illustrates a portion of said row of additional flip-flop means identified as flip-flop means 1611*a*, 1611*b* and 1611*c*. It is recognized that an additional flip-flop means may be provided for each stage included in a row; however, to simplify the illustration thereof, only three such additional flip-flop means are here depicted. Furthermore, in an attempt to avoid unnecessary complication of the drawing, only the Q2 register and its associated temporary register 131' are here illustrated. Nevertheless, it should be readily understood that temporary storage registers 151' or 152', or both, may be provided with an additional row of flip-flop means as here illustrated for the temporary storage register 131'. However, satisfactory results have been obtained when the configuration illustrated in FIG. 4B was utilized.

The flip-flop means 1611a-1611c may comprise conventional timing pulse controlled bistable multivibrators of the type conventionally employed in known shift registers. Thus, each of the flip-flop means 1611*a*-1611*c* may be similar to the individual stages employed in temporary storage register 131' and in the Q2 register. Hence, the flip-flop means 1611*a*-1611*c* are adapted to store the binary signals included in an immediately preceding row when temporary storage register 131' stores the binary signals included in a given row. It is, of course, recognized that when temporary storage register 131' stores said given row of binary signals, an immediately succeeding row of binary signals is stored in the first row of the Q2 register. As may be observed, the input terminals of multiplexing means 133 are coupled to temporary storage register 131' and selected ones of the additional flip-flop means 1611*a*-1611*c* are coupled to associated input terminals of the WD 3 DETECTOR. In a simplified implementation of the WD 3 DETECTOR, an eight-input AND gate may be provided having a first input terminal coupled to the output terminal of switching means 3 of multiplexing means 133. Additionally, second, third, fourth and fifth input terminals may be coupled to the output terminals of switching means 7, 9, 10 and 14, respectively. It may be noted that the zero output terminals of switching means 7, 9 and 10 may be coupled to the AND gate or, alternatively, suitable inverting circuits may be interposed between said switching means and the corresponding input terminals of the eight-input AND gate. A sixth input terminal of the eight-input AND gate is adapted to receive the binary signal stored in the eighth stage of the row immediately preceding that stored in temporary storage register 131'. Accordingly, flip-flop means **1611*c* is coupled to the eighth stage of temporary storage register 131' and includes an output terminal that is coupled to the sixth input terminal of the eight-input AND gate. The seventh input terminal of the eight-input AND gate is adapted to receive the binary signal stored in the eighth stage of the row under consideration. Accordingly, the output terminal of switching means 8 of multiplexing means 133 may be coupled to the seventh input terminal of the eight-input AND gate. Alternatively, as illustrated herein, the output of the eighth stage of temporary storage register 131'** may be coupled to the seventh input terminal of the eight-input AND gate. The eighth input terminal of the eight-input AND gate is adapted to receive the binary signal that is stored in the row immediately succeeding that under consideration. Accordingly, the eighth stage of the first row of the Q2 register may be coupled to the eighth input terminal of the eight-input ANd gate.

As has been noted hereinabove, multi-input AND gates, such as the eight-input AND gate that may be utilized to implement the WD 3 DETECTOR, might not be commercially available. Nevertheless, the function performed by such eight-input AND gate may be suitabley performed by the interconnected AND gates illustrated herein, which illustrated AND gates are readily available in the commercial market. Thus, AND gate 1620 includes a first input terminal coupled to the output terminal of switching means 3 of multiplexing mens 133 and a second input terminal coupled to the output terminal of switching means 14. AND gate 1619 is provided with a first input terminal coupled to the output terminal of switching means 7 via inverting means 1616, a second input terminal coupled to the output terminal of switching means 9 via inverting means 1617 and a third input terminal coupled to the output terminal of switching means 10 via inverting means 1618. The output terminals of AND gates 1619 and 1620 are coupled to corresponding input terminals of AND gate 1621, the latter AND gate having an output terminal coupled to an input terminal of AND gate 1622. In addition, AND gate 1615 is provided with a first input terminal coupled to flip-flop means **1611*c* via inverting means 1612, a second input terminal coupled to the eighth stage of temporary storage register 131' via inverting means 1613 and a third input terminal coupled to the eighth stage of the first row of the Q2 register via inverting means 1614. It is, of course, recognized that inverting means 1613 may, if desired, be coupled to the output terminal of switching means 8 of the multiplexing means 133. The WD 3 DETECTOR illustrated in FIG. 4B is thus adapted to provide an output signal when a row of binary signals, such as that illustrated as row 15 in FIG. 7A, is stored in one of the temporary registers 151', 131' or 152' and, in addition, a selected stage in an immediately preceding row as well as a selected stage in an immediately succeeding row have stored therein predetermined binary signals such as those illustrated in rows 14 and 16 of FIG. 7A. It should be apparent that the additional flip-flop means 1611*a*-1611*c* as well as the temporary storage register 131'** are here illustrated as individual components, but may be integrally included as further stages in the Q2 register.

In operation, it is appreciated that rows 11 and 13 have been previously shifted into corresponding temporary storage registers 151', 131' and 152' and have been characterized as predetermined binary word 1 and predetermined binary word 4, respectively. Subsequent shift pulses produced by timing circuit 132 are effective to shift row 15 of the weighted data field geometric configuration into temporary storage registers 151', 131' and 152' from the Q1, Q2 and Q3 registers, respectively. At this time, counting means 134 exhibits its first count such that the contents of temporary storage register 151' are coupled to the output terminals of multiplexing means 133. Thus, if temporary storage register 151' includes, inter alia, a binary "1" stored in stages 3 and 14 thereof and a binary "0" stored in stages 7, 8, 9, and 10 thereof and, in addition, if flip-flop means 1611c coupled to temporary storage register 131' stores a binary "0" therein and the eighth stage of the first row of the Q2 register also stores a binary "0" therein, the contents of temporary storage register 151' are characterized as predetermined binary word 3.

When the count exhibited by counting means 134 is incremented to its second count, the contents of temporary storage register 131' are coupled to the output terminals of multiplexing means 133. It is appreciated, therefore, that if the binary signals now stored in temporary storage register 131' include the selected binary signals schematically represented in row 15 of FIG. 7A, and if flip-flop means **1611*c* stores a binary "0" therein, and if the eighth stage of the first row of the Q2 register stores a binary "0" therein, the contents of temporary storage register 131' are characterized as predetermined binary word 3.**

The incrementing of the count exhibited by counting means 134 to its third count effects the coupling of the contents of temporary storage register 152' to the output terminals of multiplexing means 133. The contents of temporary storage register 152' are thus sampled by the plurality of word detectors and if said contents include selected binary signals such as those schematically represented in row 15 of FIG. 7A, said contents are characterized as predetermined binary word 3. It should now be readily apparent that if row 15 in any of the weighted data field geometric configurations includes selected binary signals in particular stages as schematically represented in row 15 of FIG. 7A, the WD 3 DETECTOR will be energized regardless of the particular weighted data field geometric configuration within which said row 15 is included. Consequently, nonuniformities that might appear in the presented character 10 are ineffective to forclose an accurate characterization of each discrete area scanned therein.

The illustrated WD 3 DETECTOR may be modified in a manner described hereinabove with respect to the WD 1 DETECTOR to permit a proper identification of a characteristic feature of a presented character notwithstanding a significant deterioration or mutation of said character. Hence, AND gates 1615, 1619 and 1620 may each be replaced by respective OR-circuits without impairing the capability of the instant invention to recognize a presented character.

It is noted that when row 15 is presented by multiplexing means 133 to the plurality of word detectors, the presence of a binary "1" in each of stages 3 and 14 will energize the WD 4 DETECTOR, not shown, to produce an output signal. However, such apparently erroneous characterization of row 15 will not affect the proper identification of the presented character, as will soon be appreciated from the forthcoming description of FIG. 5.

When timing circuit 132 has produced a sufficient number of shift pulses to advance the contents of row 17 in each of the Q1, Q2 and Q3 registers to corresponding temporary storage registers 151', 131' and 152', respectively, it may be appreciated that the plurality of word detectors is then capable of sampling the contents of each row 17 and to characterize said row as one of the predetermined binary words. As illustrated in FIG. 7A, row 17 in at least one of the weighted data field geometric configurations will be characterized as predetermined binary word 3 by the WD 3 DETECTOR. As the remaining rows of each weighted data field geometric configuration are successively sampled by the plurality of parallel connected word detectors, it may be seen that row 19 in at least one of the weighted data field geometric configurations will, among other characterizations, be characterized as predetermined binary word 9. Similarly, the information content of row 21 will be sampled by the plurality of word detectors and said row 21 in at least one of the weighted data field geometric configurations will be characterized as predetermined binary word 9. Likewise, row 23 in at least one of the weighted data field geometric configurations will be characterized as predetermined binary word 1.

The foregoing has described how the information content of each row of each weighted data field geometric configuration is sampled by the plurality of word detectors, and how the sampled rows may be characterized as predetermined binary words when selected binary signals are disposed in selected stages of said sampled rows. Thus, as the weighted data field geometric configurations are successively advanced in a row by row manner through each of the Q1, Q2 and Q3 registers, selected ones of the plurality of word detectors will product output signals serving to characterize each sampled row of each of the Q1, Q2 and Q3 registers as a predetermined binary word. For the scanned pattern represented by the illustration of FIG. 7A, the sampling of the rows in each weighted data field geometric configuration results in the ordered characterization of alternate ones of said sampled rows as: word 1, word 4, word 3, word 3, word 9, word 9, and word 1. It is appreciated that other ordered characterizations of the rows of the weighted data field geometric configurations will be derived because a row might include other binary signals that conform to other predetermined binary words. However, as will soon become apparent, such other ordered characterizations will not affect the proper identification of the scanned pattern. It is further noted that although each successive row in each weighted data field geometric configuration is sampled by the plurality of word detectors, the high density of rows of binary signals derived from each scanned character permits the consideration of either one of pairs of successive rows. Nevertheless, the characterization of each successive row and the use of such characterizations is not beyond the scope of the present invention. If desired, the density of derived rows may be reduced, with an accompanying increase in the effective height of each row, merely by increasing the dimension of each photodiode included in scanning means 11 or by combining the outputs of adjacent photodiodes. It is noted, however, that this would be accompanied by a decrease in resolution.

WD 16 DETECTOR

The WD 1 DETECTOR and the WD 3 DETECTOR are deemed to be typical of the plurality of word detectors that may be employed in word detecting means 16 of FIG. 1. A complete understanding of the present invention may be facilitated by now describing another word detector that is employed herein to detect a characteristic feature of a presented character such as a characteristic feature that may be exhibited by the alphanumeric character "4." This characteristic feature is arbitrarily represented by predetermined binary word 16 and the manner in which a pattern, such as alphanumeric character "4," exhibits said characteristic feature may be observed in FIg. 7B. As illustrated therein, a discrete area of a data field geometric configuration may be characterized as predetermined binary word 16 if said discrete area is comprised of a given row of binary signals wherein a binary "1" is disposed in the fourth stage of said given row, a binary "0" is disposed in the seventh, eight and ninth stages of said given row, a binary "0" is disposed in the eighth stage of an immediately succeeding row, and a binary "0" is disposed in the eighth stage of the first, second, third, fourth and fifth immediately preceding rows. A typical implementation of the WD 16 DETECTOR may thus be formed of a 10-input AND gate having a first input terminal coupled to the output terminal of switching means 4 of multiplexing means 133, second and third input terminals coupled to the zero output terminals of switching means 7 and 9 of the multiplexing means, a fourth input terminal coupled to the eighth stage of the first row of the Q2 register, a fifth input terminal coupled to the eighth stage of temporary storage register 131' (or, in the alternative, to the zero output terminal of switching means 8 of the multiplexing means) and five input termianls adapted to be supplied with the contents of the eighth stage of each of the five immediately preceding rows that had been shifted through temporary storage register 131'. It is recalled from the foregoing description of FIG. 4B that an immediately preceding row of binary signals may be stored by providing additional flip-flop means to store said preceding row. Accordingly, flip-flop means 1611*a*, 1611 *b* and 1611*c* were provided in FIG. 4B to store the binary signals of a row that is in immediate preceding relationship with respect to the row of binary signals stored in temporary storage register 131'.

Referring now to FIG. 4C, means is illustrated further apparatus capable of storing additionally preceding rows of binary signals and includes additional flip-flop means 1631, 1632, 1633 and 1634. It may be appreciated, that only a single flip-flop means 1631 is illustrated, whereas an entire row of flip-flop means may be provided. Similarly, single flip-flop means 1632, 1633 and 1634 are illustrated, it being understood that each said illustrated flip-flop means may be representative of an entire row thereof. Flip-flop means 1631-1634 may each be similar to aforedescribed flip-flop means 1611c and are here illustrated as being connected in series thereto to enable binary signals to be sequentially shifted therethrough. Thus, flip-flop means 1631–1634 may each include a shift pulse input terminal adapted to be supplied with shift pulses produced by timing circuit 132. Thus, when for example, the eleventh row of binary signals is shifted from the Q2 register to temporary storage register 131', it may be observed that the twelfth row is now stored in the first row of the Q2 register, the contents of the eighth stage of the tenth row of the data field geometric configuration is stored in flip-flop means 1611*c*, said flip-flop means being coupled to the eighth stage of temporary storage register 131', the contents of the eighth stage of the ninth row of the data field geometric configuration is stored in flip-flop means 1631, the contents of the eighth stage of the eighth row of the data field geometric configuration is stored in flip-flop means 1632, the contents of the eighth stage of the seventh row of the data field geometric configuration is stored in flip-flop means 1633 and the contents of the eighth stage of the sixth row of the data field geometric configuration is stored in flip-flop means 1634. Hence, an effective memory is provided for the preceding history of the rows of binary signals successively shifted through temporary storage register 131'. It is, of course, appreciated that the additional flip-flop means may be combined with the temporary storage register 131' and the Q2 register in an integral structure. Hence, the designated first row of the Q2 register may be any arbitrary row, the next preceding rows comprising the temporary storage register and the additional flip-flop means, respectively.

It is recognized that a 10-input AND gate might not be commercially available and, therefore, the function thereof may be implemented by such AND gates as may be readily obtained in the commercial market. Thus, a 10-input AND gate may be synthesized by the illustrated AND gates 1639 and 1645 having output terminals coupled to a further AND gate 1646. The input terminals of AND gates 1639 and 1645 are selectively provided with the binary signals stored in the selected stages as schematically illustrated in FIG. 7B. More particularly, the output terminal of switching means 4 of multiplexing means 133 is connected to AND gate 1645 and the output terminals of switching means 7 and 9 of the multiplexing means are connected to AND gate 1639 via inverting means 1635 and 1636, respectively. It may be noted that the inverting means may be omitted if the zero output terminals of switching means 7 and 9 of multiplexing means 133 are directly connected to AND gate 1639. The eighth stage of temporary storage register 131' is connected to AND gate 1639 via inverting means 1637. If desired, inverting means 1637 may be connected, in the alternative, to the output terminal of switching means 8 of multiplexing means 133. The eighth stage of the first row of the Q2 register is connected to AND gate 1639 via inverting means 1638. The contents of the eighth stage of each of the immediately preceding rows are coupled to AND gate 1645 in the following manner: flip-flop means 1611*c* is coupled to AND gate 1645 via inverting means 1640; flip-flop means 1631 is coupled to AND gate 1645 via inverting means 1641; flip-flop means 1632 is coupled to AND gate 1645 via inverting means 1642; flp-flop means 1633 is coupled to AND gate 1645 via inverting means 1643; and flip-flop means 1634 is coupled to AND gate 1645 via inverting means 1644. It may thus be appreciated that the WD 16 DETECTOR is adapted to be energized when selected binary signals stored in selected stages of a given row, taken with selected binary signals stored in selected stages of both succeeding and preceding rows, admit of the proper coinciding relationship. According, if the discrete area of any of the weighted data field geometric configurations admit of an information content that corresponds to the characteristic feature depicted by the predetermined binary word 16, that discrete area is characterized as binary word 16.

It should now be readily understood that the weighted data field geometric configurations developed from the scanning of presented character 10 are examined by the plurality of word detectors on a row by row basis. When the information content of an examined row corresponds to that represented by a predetermined binary word, a corresponding word detector is energized. Each of the plurality of word detectors may be considered as a comparator capable of comparing the binary signals supplied thereto to an associated one predetermined binary word, or voltage character. Hence, the word detectors may be thought of as being wired to a source of predetermined binary words to effect the comparison. A coinciding relationship exhibited by the selected binary signals supplied to a word detector represents a favorable comparison (i.e., a "match") between said selected binary signals and the unique voltage character represented as the predetermined binary word. For example, as rows 10–23 are sampled by the plurality of word detectors, the successive rows would be characterized as schematically illustrated in FIG. 7A if said presented character is the alphanumeric character "0." Similarly, the successively sampled rows of the presented character might be characterized as schematically illustrated in FIG. 7B if the presented character is the alphanumeric character "4." As noted hereinabove, the various additional characterizations of each examined row that might be obtained may be effectively "ignored" if the indicated characterizations are detected. The "ignoring" of spurious characterizations is achieved by sequence detecting means 18 now described.

CHARACTERIZATION SEQUENCE DETECTION

Figure 5:
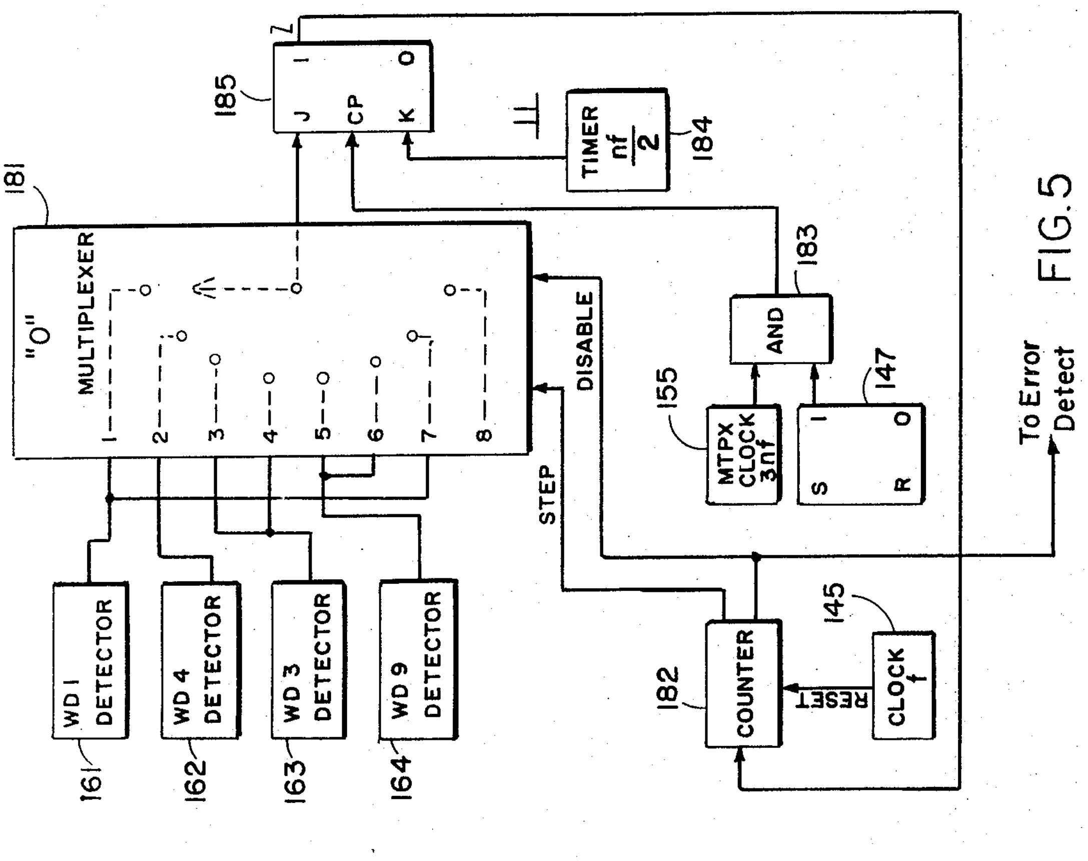
FIG. 5 is a logic diagram of one embodiment of a typical sequence detecting circuit that may be included in the sequence detecting means of FIG. 1.

Referring now to FIG. 5, there is illustrated a portion of the apparatus comprising sequence detecting means 18 and includes stepping means 181, advancing means 182 and enabling means 185. The illustrated apparatus is adapted to store a single sequence of characterizations and to compare said stored sequence with the sequence of characterizations manifested by the plurality of word detectors. Accordingly, the illustrated apparatus is duplicated for each stored predetermined sequence and, as is recalled, a single predetermined sequence of characterizations is thus provided for each alphanumeric character that the present apparatus is capable of identifying. In the interest of brevity, and to simplify the instant drawings, only the apparatus capable of detecting a sequence of characterizations exhibited by the alphanumeric character "0" is illustrated herein. It is to be understood that the remaining sequence detectors are similar in structure and operation to that depicted herein.

Stepping means 181 may comprise gating means having a plurality of input terminals, a single output terminal and a control input. The output terminal of stepping means 181 is adapted to be coupled to a selected one of the input terminals via the gating means included therein in response to a control signal applied to the control input. A simplification of stepping means 181 may be considered as a conventional stepping switch having a movable armature connected to the output terminal thereof and a plurality of fixed contacts coupled to the input terminals thereof. The movable armature is capable of contacting each of the fixed contacts in sequence in response to a control signal applied thereto. A contemplated embodiment of stepping means 181 may be implemented by a conventional multiplexing circuit such as model 9312 manufactured by the Fairchild Semiconductor Corporation of Mountain View, California.

Each input terminal of stepping means 181 is coupled to an individual word detector of the type previously described with respect to FIGS. 4A-4C. The order in which said input terminals are coupled to the word detectors represents a stored predetermined sequence. Thus, the predetermined sequence representing alphanumeric character "0" is here represented by predetermined binary word 1, predetermined binary word 4, predetermined binary word 3, predetermined binary word 3, predetermined binary word 9, predetermined binary word 9 and predetermined binary word 1. It is appreciated that if successive rows of the weighted data field geometric configurations are characterized in the sequence just mentioned, the presented character exhibits those characteristic features that, in combination, may be identified as the alphanumeric character "0." This identification will obtain regardless of the particular data field geometric configuration within which the characterized rows are included.

The control input of stepping means 181 is coupled to a first output terminal of advancing means 182, the latter being adapted to generate control signals to advance the coupling of the output terminal of stepping means 181 from a given input terminal to the next succeeding input terminal thereof. Advancing means 182 may comprise a conventional binary counting circuit adapted to count a number of pulses applied thereto. The count exhibited by the illustrated counting circuit is capable of being incremented when the signal supplied thereto undergoes a negative transition. The count exhibited by the counting circuit 182 is utilized at the first output terminal thereof as a control signal to identifiy the particular input terminal of stepping means 181 to which said output terminal thereof is to be coupled.

The input terminal of counting circuit 182 is coupled to enabling means 185. The enabling means may comprise a conventional timing pulse controlled bistable multivibrator such as a J-K flip-flop circuit or the like. The flip-flop means 185 includes a set input terminal coupled to the output terminal of stepping means 181 and a reset input terminal coupled to a timing generator 184. A clock pulse input terminal is coupled to aforedescribed multiplex clock generator 155 via AND gate 183. Another input terminal of AND gate 183 is coupled to the 1 output terminal of aforedescribed flip-flop means 147. Timing generator 184 is adapted to produce timing pulses admitting of a frequency $nf/2$ which, it is recognized, is equal to one-half the frequency at which a row of binary signals is shifted to an adjacent row in the Q1, Q2 and Q3 register.

Counting circuit 182 includes a second output terminal coupled to a disable input terminal of stepping means 181. The second output terminal is adapted to be provided with a signal when a predetermined count is attained by the counting circuit. Counting circuit 182 additionally includes a reset input terminal coupled to aforedescribed clock generator 145 and is therefore capable of receiving clock pulses generated at a frequency $f$. Thus, the count exhibited by the counting circuit is adapted to be reset to an initial count after all n rows of the weighted data field geometric configuration are examined by the plurality of word detectors.

The operation of the illustrated apparatus will now be described for a particular example wherein the presented character corresponds to the alphanumeric character "0." It is, of course, to be understood that the remaining sequence detectors, not shown, that comprise sequence detecting means 18 operate in a similar manner to sense when the sequence of characterizations obtained from the plurality of word detectors corresponds to a stored predetermined sequence other than that represented in FIG. 5. It should be stated that as the Q1, Q2 and Q3 registers are serially supplied with binary signals by the multi-level quantizing means, the plurality of word detectors function to sequentially examine each of the $n$ rows included in said registers. During the period that the weighted data field geometric configurations are developed by the Q1, Q2 and Q3 registers, it is possible that selected stages therein may fortuitously store selected signals which may be characterized by some of the plurality of word detectors as predetermined binary words. It is appreciated, however, that while the weighted data field configurations are being developed, such characterizations are erroneous and the sequence thereof should not at that time be compared to the plurality of stored predetermined sequences. Thus, flip-flop means 147 remains reset in its second state to thereby inhibit the operation of the illustrated sequence detector until the data field geometric configuration developed in the Q2 register is properly positioned therein. When flip-flop means 147 is set to its first state, AND gate 183 is enabled to couple the multiplex clock pulses supplied thereto by multiplex clock generator 155 to the clock pulse input terminal of flip-flop means 185. The flip-flop means is thus capable of storing the binary signal supplied thereto by stepping means 181 when a multiplex clock pulse is received. The illustrated apparatus is thus enabled to sense the sequence of characterizations supplied thereto by the plurality of word detectors and to compare said sequence with the stored predetermined sequence corresponding to the alphanumeric character "0."

As each row of binary signals in each of the Q1, Q2 and Q3 registers is examined in time-division fashion by the plurality of word detectors, it is appreciated that selected ones of said word detectors produce output signals when an examined row includes binary signals that correspond to associated predetermined binary words. The output signals produced by such word detectors are applied to those input terminals of the various stepping means to which said word detectors are coupled. Thus, for example, when row 11 of the weighted data field geometric configuration illustrated in FIG. 7A is sampled, it is recalled that the WD 1 DETECTOR produces an output signal. It is further recalled that other word detectors, such as the WD 4 DETECTOR, likewise produce output signals. Thus, a binary "1" is applied to input terminals 1, 2 and 7 of stepping means 181 when row 11 is sampled. The binary "1" supplied to input terminal 1 is coupled to the output terminal thereof and supplied by the stepping means to the set input terminal of flip-flop means 185. Consequently, the flip-flop means is set to its first state and an appropriate output signal is provided at the 1 output terminal thereof. It is here noted that flip-flop means 185 will be set to its first state if the WD 1 DETECTOR produces an output signal in response to its sampling of row 11 in either the Q1, Q2 or Q3 registers. It may be observed that when the contents of row 11 of the Q1 register are examined by the word detectors, a multiplex clock pulse is supplied by multiplex clock generator 155 through AND gate 183 to the clock pulse input terminal of flip-flop means 185. Thus, if row 11 of the Q1 register has stored therein binary signals as schematically represented in row 11 of FIG. 7A, the binary "1" produced by the WD 1 DETECTOR and coupled through stepping means 181 to the set input terminal of flip-flop means 185 is stored in said flip-flop means in response to the multiplex clock pulse supplied to the clock pulse input terminal thereof. If, however, row 11 of the Q1 register is not characterized as predetermined binary word 1, flip-flop means 185 is not, at this time, set to its first state. As WD 1 DETECTOR samples row 11 of the Q2 register, a multiplex clock pulse is applied to the clock pulse input terminal of flip-flop means 185 through AND gate 183. The flip-flop means may thus be set to its first state if WD 1 DETECTOR characterizes row 11 of the Q2 register as predetermined binary word 1. Similarly, if row 11 of the Q3 register is characterized as predetermined binary word 1, the WD 1 DETECTOR supplies a binary "1" to the set input terminal of flip-flop means 185 through stepping means 181, enabling the flip-flop means to be set to its first state upon receiving a multiplex clock pulse at the clock pulse input terminal thereof.

Thus, if row 11 of one of the Q1, Q2 and Q3 registers is characterized as predetermined binary word 1, it may be appreciated that flip-flop means 185 is set to its first state. When the plurality of word detectors next examines row 12 in each of the Q1, Q2 and Q3 registers, the first state to which flip-flop means 185 is set is not altered. Prior to the examination of row 13 in each of the Q1, Q2 and Q3 registers by the plurality of word detectors, timing means 184 supplies the reset input terminal of flip-flop means 185 with a timing pulse. It is appreciated that the timing pulses produced by timing means 184 are synchronized with the multiplex clock pulses produced by multiplex clock generator 155. Accordingly, the application of a timing pulse to the reset input terminal of flip-flop means 185 is effective to reset said flip-flop means to its second state. Consequently, the 1 output terminal of the flip-flop means is provided with a signal that exhibits a negative transition.

The negative transition provided at the 1 output terminal of flip-flop means 185 is coupled to the counting circuit 182 to increment the count exhibited thereby. The incremented count is applied as a control signal to stepping means 181 whereupon the interconnection of the output terminal thereof is advanced so as to now be coupled to input terminal 2 thereof. Row 13 in each of the Q1, Q2 and Q3 registers is now sampled by the plurality of word detectors and if the contents of row 13 in any of the registers corresponds to that illustrated in FIG. 7A, a binary "1" is applied to input terminal 2 of stepping means 181, notwithstanding the generation of other output signals by other word detectors upon the examination of row 13, Hence, a binary "1" is coupled from input terminal 2 to the output terminal of stepping means 181 and thence to the set input terminal of flip-flop means 185. It is appreciated that a multiplex clock pulse will be applied to the clock pulse input terminal of flip-flop means 185 in coincidence with the binary "1" supplied to the set input terminal thereof. Consequently, flip-flop means 185 is set to its first state. When timing means 184 next produces a timing pulse, flip-flop means 185 is reset to its second state and the negative transition provided at the 1 output terminal thereof is effective to increment the count exhibited by the counting circuit 182.

Accordingly, the interconnection within stepping means 181 is advanced in response to the control signal applied thereto by the counting circuit 182 to thereby couple input terminal 3 to the output terminal thereof. Row 15 of each of the Q1, Q2 and Q3 registers is now sampled by the plurality of word detectors and if WD 3 DETECTOR characterizes the information content of row 15 as predetermined binary word 3, a binary "1" is coupled from the output of WD 3 DETECTOR to input terminal 3 of stepping means 181, thence to the output terminal of said stepping means and to the set input terminal of flip-flop means 185. Flip-flop means 185 may thus be set to its first state and, upon receiving a timing pulse from timing means 184, is reset to its second state to thereby supply counting circuit 182 with a negative transition.

The count exhibited by counting means 182 is thus incremented and the output terminal of stepping means 181 is coupled to input terminal 4 thereof. If the contents of row 17 in any of the Q1, Q2 or Q3 registers corresponds to that illustrated in FIG. 7A, the WD 3 DETECTOR applies a binary "1" to input terminals 3 and 4 of stepping means 181. Since the output terminal of the stepping means is coupled to input terminal 4 thereof, the binary "1" produced by WD 3 DETECTOR is supplied through the stepping means to the set input terminal of flip-flop means 185. The flip-flop means is thus reset in response to the next received timing pulse produced by timing means 184 and the negative transition provided at the one output terminal thereof is applied to the counting circuit 182 to increment the count exhibited thereby. Thus, the output terminal of stepping means 181 is advanced to input terminal 5.

If, now, row 19 of the Q1, Q2 or Q3 register is characterized by WD 9 DETECTOR as predetermined binary word 9, a binary "1" is coupled from input terminal 5 through the stepping means to the output terminal thereof and thence to the set input terminal of flip-flop means 185. The flip-flop means is thus set to its first state and, upon receiving the next timing pulse from timing means 184, a negative transition is applied to counting circuit 182 from the 1 output terminal of flip-flop means 185. The count thus exhibited by the counting circuit is incremented such that the output terminal of stepping means 181 is coupled to input terminal 6 thereof. At this time, row 21 of each of the Q1, Q2 and Q3 registers is examined by the word detectors and, if said row is characterized as predetermined binary word 9, a binary "1" is coupled through stepping means 181 from input terminal 6 thereof to the output terminal thereof. Flip-flop means 185 is thus set to its first state and a negative transition is subsequently applied to the counting circuit 182 when the next timing pulse produced by timing means 184 is supplied to the reset input terminal of flip-flop means 185.

The count exhibited by counting circuit 182 is now incremented and said incremented count is applied as a control signal to stepping means 181 whereupon input terminal 7 thereof is coupled to the output terminal thereof. Row 23 of each of the Q1, Q2 and Q3 registers is next examined by the word detectors and if said examined row is characterized as predetermined binary word 1, a binary "1" is coupled from input terminal 7 to the output terminal of stepping means 181. As is now appreciated, flip-flop means 185 is set to its first state in response to the binary "1" coupled to the output terminal of the stepping means and the count exhibited by counting circuit 182 is incremented when the flip-flop means is reset in response to the next received timing pulse supplied to the reset input terminal of the flip-flop means by timing means 184. The incremented count now exhibited by the counting circuit 182 is effective to couple the output terminal of stepping means 181 to input terminal 8 thereof. The counting circuit now exhibits a predetermined count (which, for the present example, may be assumed to be a count of eight) such that an output signal is provided at the second output terminal thereof. The output signal is applied to a disable input terminal of stepping means 181 to return said stepping means to its initial condition and to inhibit further operation thereof. Moreover, the output signal produced at the second output terminal of the counting circuit 182 indicates that the characterization sequence developed by the word detectors corresponds to the stored predetermined sequence that represents the alphanumeric character "0." Accordingly, the output signal produced by the counting circuit 182 may be applied to suitable indicating means to apprise an operator that the presented character 10 has been identified as the alphanumeric character "0." Further, the output signal may be applied to encoding means whereby a suitable binary coded signal may be generated in any appropriate machine language to represent that presented character 10 is the alphanumeric character "0." Additionally, the output signal produced by the counting circuit 182 may be applied to error detecting means for a purpose soon to be described with respect to FIG. 6.

It is here noted that concurrent with the operation of stepping means 181, similar stepping means, not shown, each included in a further sequence detector associated with an individual alphanumeric character, operate in an analogous manner, to respond to the output signals supplied thereto by the particular word detectors selectively coupled to the input terminals thereof. Thus, as each the row of the weighted data field geometric configurations is examined, it is expected that the various characterizations of said examined row results in advancing more than only one stepping means. However, it is appreciated that only one of the plurality of stepping means will be supplied with signals at successive input terminals thereof in a proper order to enable the output terminal thereof to be successively coupled to each of said input terminals. Consequently, only one of the counting circuits 182 associated with each corresponding stepping means will exhibit a count incremented to the aforementioned predetermined count. Thus, if a presented character timing admitting of a character such as that illustrated in FIG. 7A is scanned by the apparatus of the present invention, it is not unreasonable to expect that one of the stepping means might be advanced such that the output terminal thereof is coupled to, for example, input terminal 5 thereof and another stepping means might be advanced such that the output terminal thereof might be coupled to input terminal 6 thereof. The respective counting circuits associated with said stepping means may, therefore, exhibit counts of, for example, five and six, respectively. However, only stepping means 181 will be advanced such that the output terminal thereof will be coupled to input terminal 8 thereof and counting circuit 182 associated therewith will exhibit a count of eight.

Consequently, only one of the characterization sequences developed by the word detectors will favorably compare with the predetermined stored sequences and the presented character will be identified accordingly.

The foregoing explanation might be further understood by briefly considering the operation of stepping means 181 if the presented character 10 is an irregular alphanumeric character "8," for example. As the data field geometric configurations of the scanned character are sampled by the word detectors, the first three successive rows of the character might be characterized as predetermined binary words 1, 4 and 3. The output terminal of stepping means 181 may thus be coupled to input terminal 4 thereof when the next successive row of the character is examined. This row will not be characterized as predetermined word 3 and the interconnection of stepping means 181 will not be altered. The next examined rows of the presented character may be characterized as predetermined binary words 3 and 9 and the coupling of the output terminal of stepping means 181 will be advanced accordingly to input terminal 6. Thus, when the presented character is completely scanned, stepping means 181 will not be advanced such that the output terminal thereof is coupled to input terminal 8 and the count exhibited by counting circuit 182 will not correspond to its predetermined count. The developed characterization sequence will, therefore, not be identified as corresponding to the alphanumeric character "0" but, on the contrary, will be identifies as that sequence corresponding to the alphanumeric character "8." After the *n-th* row of each of the Q1, Q2 and Q3 registers is examined by the word detectors, it is recognized that a clock pulse is produced by clock generator 145 to reset counting circuit 182 to its initial count. The illustrated apparatus is thus prepared to recognize the next characterization sequence to be developed by the word detectors. The illustrated apparatus will continue to operate in the aforedescribed manner until flip-flop means 147 is reset to its second state, thereby inhibiting the application of multiplex clock pulses to the clock pulse input terminal of flip-flop means 185. It is recalled that flip-flop means 147 may be assumed to be reset to its second state witin the time required to shift a column of binary signals in the Q1, Q2 and Q3 registers to a plurality of succeeding columns. Accordingly, the apparatus illustrated in FIG. 5 is operable during plural cycles of operation by the word detectors once the weighted data field geometric configurations are properly positioned within the Q1, Q2 and Q3 registers to provide a plurality of identifications of the presented character.

Although not illustrated herein, one of ordinary skill in the art will recognize that apparatus capable of detecting a developing characterization sequence and comparing said developing sequence to the stored predetermined sequence associated with the alphanumeric character "4" may be facilely implemented. Thus, with reference to FIG. 7B, it is appreciated that a stepping means similar to stepping means 181 of FIG. 5 may include a first input terminal coupled to the WD 16 DETECTOR, second and third input terminals coupled in common to the WD 17 DETECTOR, a fourth input terminal coupled to the WD 18 DETECTOR, a fifth input terminal coupled to the WD 1 DETECTOR, a sixth input terminal coupled to the WD 19 DETECTOR and a seventh input terminal coupled to the WD 20 DETECTOR. Such uniquely coupled stepping means may be additionally provided with advancing means and enabling means such as that described in detail with reference to the illustrated apparatus of FIG. 5.

Although a specific embodiment of apparatus that may be included in sequence detecting means 18 is illustrated in FIG. 5, it is apparent that various obvious modifications thereof are contemplated. Thus, the stepping means 181 may be provided with, for example, twice the number of illustrated input terminals, each being coupled to a selected one of the plurality of word detectors. In addition, the frequency of the timing pulses generated by timing means 184 may be doubled to be equal to *nf.* Furthermore, counting circuit 182 may be readily modified to be compatible with the number of input terminals with which stepping means 181 is provided to thereby enable the output terminal of the stepping means to be successively coupled to each of the input terminals thereof. It is apparent that this obvious modification of the apparatus illustrated in FIG. 5 will thus be responsive to characterizations of each row of binary signals stored in the Q1, Q2 and Q3 registers by the plurality of word detectors.

ERROR DETECTION

Figure 6:
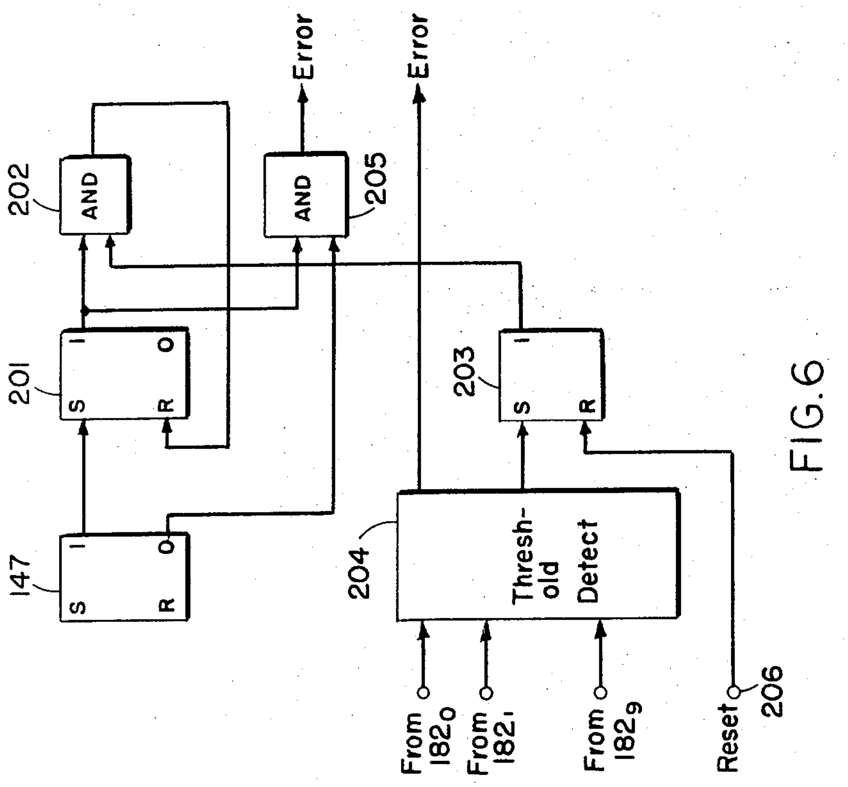
FIG. 6 is a logic diagram of an error detecting circuit that may be included in the apparatus illustrated in FIG. 1.

Referring now to FIG. 6, there is illustrated a contemplated embodiment of error detecting means 20 capable of detecting when a presented character cannot be identified as one of the predetermined types of alphanumeric characters, and for detecting when the presented character is erroneously identified as more than one predetermined type. The illustrated error detecting means is comprised of flip-flop means 201 and 203, AND gates 202 and 205 and threshold detecting means 204. Flip-flop means 201, which may be similar to aforedescribed flip-flop means 147, includes a set input terminal thereof coupled to the 1 output terminal of flip-flop means 147 and a 1 output terminal coupled in common relationship to respective input terminals of AND gates 202 and 205. The output terminal of AND gate 202 is coupled to the reset input terminal of flip-flop means 201. An additional input terminal of AND gate 205 is coupled to the 0 output terminal of flip-flop means 147. An additional input terminal of AND gate 202 is coupled to the 1 output terminal of flip-flop means 203, the latter flip-flop means including a set input terminal coupled to threshold detecting means 204 and a reset input terminal coupled to terminal 206.

Threshold detecting means 204 is adapted to produce a first output signal when the sequence detecting means has determined that the characterization sequences developed by the plurality of word detectors correspond to more than one of the stored predetermined sequences. A second output signal is produced when the developed characterization sequences are sensed as corresponding to a single stored predetermined sequence. Accordingly, threshold detecting means 204 includes a plurality of input terminals each coupled to a corresponding one of counting circuits 182 included in each sequence detector. Thus, as illustrated herein, a first input terminal of threshold detecting means 204 is coupled to counting circuit 182 included in the sequence detector associated with the alphanumeric character "0," a second input terminal of threshold detecting means 204 is coupled to the counting circuit 182 included in the sequence detector associated with the alphanumeric character "1," and so on. The threshold detecting means may comprise a conventional analog summing circuit coupled to each of the input terminals and a conventional threshold triggering circuit coupled to said analog summing circuit. One such threshold triggering circuit may comprise a conventional Schmitt trigger device.

In operation, flip-flop means 201 is set to its first state in response to the setting of flip-flop means 147 to its respective first state. Consequently, a binary "1" is supplied to an input terminal of each of AND gates 202 and 205 by the 1 output terminal of flip-flop means 201 when the weighted data field geometric configurations are properly positioned in the Q1, Q2 and Q3 registers. If a presented character is identified as one predetermined type of alphanumeric character, threshold detecting means 204 will be supplied with a single output signal by the sequence detecting means. The analog summing circuit included in threshold detecting means 204 will thus produce a signal that is intermediate first and second predetermined threshold levels. Consequently, threshold detecting means 204 will apply a binary "1" to the set input terminal of flip-flop means 203 thereby setting the flip-flop means to its first state. Accordingly, a binary "1" is supplied to the second input terminal of AND gate 202 by the 1 output terminal of flip-flop means 203, thereby energizing said AND gate. The energized AND gate applies to a binary "1" to the reset input terminal of flip-flop means 201 to thus reset the flip-flop means to its second state. Accordingly, AND gate 205 is now disabled. When flip-flop means 147 is reset to its second state, AND gate 205 does not respond thereto.

Let it now be assumed that the characterization sequence developed by the word detectors does not correspond to any of the stored predetermined sequences. Accordingly, threshold detecting means 204 will not be supplied with an input signal at any of the input terminals thereof and, consequently, will not produce an output signal sufficient to set flip-flop means 203 to its set state. It may be appreciated that flip-flop means 201 will thus remain in its first state after being set thereto by flip-flop means 147. When flip-flop means 147 is reset to its second state, AND gate 205 is supplied with a binary "1" at each input terminal thereof to produce an error signal indicating that the weighted data field geometric configurations have been properly positioned within with Q1, Q2 and Q3 registers, that each row of the properly positioned weighted data field geometric configurations has been examined by the plurality of word detectors but that the weighted data field geometric configurations do not correspond to an alphanumeric character of known type.

If the characterization sequence developed by the plurality of word detectors favorably compare to more than one stored predetermined sequence, it is recognized that threshold detecting means 204 is provided with more than one signal at the input terminals thereof. A summation of the applied signals by the analog summing means included in threshold detecting means 204 results in a summed signal admitting of a magnitude that exceeds both the first and second predetermined threshold levels. Accordingly, the threshold detecting means produces the aforementioned first output signal, corresponding to an error signal indicating that the presented character has been erroneously identified as more than one predetermined type of alphanumeric character.

The error signals produced by AND gate 205 and threshold detecting means 204 may be coupled to the encoding means 19 of FIG. 1 to inhibit the operation thereof. In addition, the error signals may be coupled to suitable indicating means to apprise an operator of an error in the recognition process performed by the apparatus of the present invention and to particularly identify the type of error detected. Flip-flop means 203 may be reset to its second state in response to a signal applied to terminal 206 by the peripheral equipment, not shown, that may be utilized in the various applications for which the present invention is contemplated. Thus, the signal applied to terminal 206 may represent an acknowledgement by further apparatus that the encoded signals applied thereto by encoding means 19 of FIG. 1 have been received. Alternatively, the signal applied to terminal 206 may be generated by suitable means prior to the scanning of a next presented character to prepare the illustrated error detecting means to detect a subsequent error.

While the invention has been particularly shown and described with reference to exemplary embodiments thereof, it will be obvious to those skilled in the art that various changes and modifications in form and details may be made without departing from the spirit and scope of the invention. Thus, the specific numerical examples described hereinabove are intended to be merely illustrative of the operation of the apparatus disclosed herein and are not intended to limit the teachings of the instant invention. Thus, the number of predetermined binary words to which the contents of each row of the weighted data field geometric configurations are compared may be any suitable number. Additionally, the selected signals comprising each predetermined binary word may be readily modified to represent the various characteristic features exhibited by alphanumeric characters to be identified. Consequently, the sequence in which successive rows of binary signals of the predetermined alphanumeric characters are characterized may be adopted to be compatible with the particular characteristic features to be sensed. Additionally, the number of quantizing levels to be utilized, described hereinabove as, typically, three quantizing levels, may be any suitable number to compensate for nonuniformities in a presented character. Nevertheless, in an actual reduction to practice of the concepts disclosed herein wherein 10 characters per inch were scanned having scanning columns admitting of a width of 5 mils, the capability existed to scan at a rate of from 1 character per second to 3,000 characters per second. In the latter mode, clock generator 145 exhibited an operating frequency of 3 MHz.

Various other obvious modifications may be made to the illustrated apparatus. For example, each temporary storage register 151', 131' and 152' has been illustrated, for the purpose of explanation, as an individual component. Alternatively, the temporary storage registers may be integrally included in the Q1, Q2 and Q3 registers, respectively, and may be arbitrarily designated as further rows therein. Similarly, the additional flip-flop means of FIGS. 4B and 4C may be included as further rows in the Q2 register. With regard to the Q1, Q2 and Q3 registers described hereinabove, the total number of stages included in each register, and the arrangement of such stages into columns and rows, may be varied to obtain a particular resolution of a scanned character. Hence, the scanned character may be represented by any suitable number of rows of binary signals. Furthermore, the word detecting means described herein above is not limited solely to the examination of successive rows in the Q1, Q2 and Q3 registers. Accordingly, succeeding columns of binary signals may be so examined.

While logic circuits comprised of conventional AND gates and OR circuits have been illustrated herein, it is contemplated that other conventional logic components such as NAND gates, NOR circuits and the like, may be substituted therefor. Similarly, the precise mode of logic operation employed by such substituted logic components may differ from that described hereinabove in a manner that is obvious to those of ordinary skill in the art. Furthermore, in the foregoing description, it had been assumed that a binary "1" might be represented by a positive DC potential and a binary "0" might be represented by ground potential. It is, of course, understood that the foregoing binary signals may be represented by any suitable voltage potentials and that logical components responsive to a binary "1" may be replaced by equivalent components responsive to a binary "0."

It should now be readily appreciated that the novel techniques disclosed herein serve to digitally examine a presented character for the presence therein of certain predetermined characteristic features, to identify such sensed characteristic features and to detect the order in which said characteristic features are arranged. The presented character may then be recognized in accordance with the detected order in which said sensed characteristic features are disposed. Moreover, the characteristic features which are sensed are provided in discrete areas exhibiting any convenient geometric configuration; the combination of said discrete areas forming the presented character.

What is claimed is:

1. A method of identifying a presented character comprising the steps of:

scanning said presented character to derive an array of voltages representative of the configuration of said presented character;

quantizing said array of voltages at plural quantizing levels to develop a corresponding plurality of field arrays of binary levels, each said field array representing a weighted geometric configuration of binary levels that is a function of an associated quantizing level to compensate for nonuniformities in said presented character, said representative geometric configuration of binary levels being in approximate conformity with the geometric configuration of said presented character;

sequentially comparing discrete areas of each of said plurality of field arrays with predetermined binary characters until each entire field array has been compared and indicating a positive comparison when a discrete area and a predetermined binary character admit of a corresponding relationship;

sensing the characterization of a given row and each of the remaining rows in any of said field arrays as particular binary characters; and identifying said presented character as said known type when the sequence of particular binary characters sensed is identical to a unique sequence pre-established for said type regardless of the individual field arrays within which the characterized rows are included.

2. The method of claim 1 wherein said step of quantizing comprises the steps of:

developing a first field array of first binary levels when those voltages included in said array of voltages exceed a first quantizing level and second binary levels when those voltages included in said array of voltages are less than said first quantizing level;

developing a second field array of first binary levels when those voltages included in said array of voltages exceed a second quantizing level and second binary levels when those voltages included in said array of voltages are less than said second quantizing level, said second quantizing level being less than said first quantizing level; and developing a third field array of first binary levels when those voltages included in said array of voltages exceed a third quantizing level and second binary levels when those voltages included in said array of voltages are less than said third quantizing level, said third quantizing level being less than said second quantizing level.

3. The method of claim 2 wherein said steps of developing a first field array, developing a second field array and developing a third field array each include the step of arranging said first and second binary levels in rows and columns whereby said first field array represents a normalized character formed of relatively thick strokes, said second field array represents a character formed of relatively normal strokes and said third field array represents a normalized character formed of relatively thin strokes.

4. The method of claim 3 wherein said step of sequentially comparing comprises the steps of:

simultaneously detecting the coincidence of selected ones of said first and second binary levels of a given row of successive field arrays with corresponding binary levels that uniquely form each of said predetermined binary characters; and repeating the last-mentioned step in succession for each of the remaining rows of said field arrays.

5. The method of claim 4 wherein said step of sequentially comparing further comprises the step of indicating the coincidence of each row of each field array with one of said predetermined binary characters whereby the coinciding row is characterized as said one binary character.

6. A method of identifying a presented character comprising the steps of:

storing a plurality of arrays of binary signals, said arrays being derived from a single scanning of said presented character and providing representations of the configuration of said presented character; said plurality of arrays including at least a first array comprised of a multiple of rows of binary signals to store a normalized representation of a character formed of relatively thick strokes, a second array comprised of a multiple of rows of binary signals to store a representation of a character formed of relatively normal strokes and a third array comprised of a multiple of rows of binary signals to store a normalized representation of a character formed of relatively thin strokes;

sequentially comparing each row of each of said plurality of arrays with predetermined binary characters until each entire array has been compared and indicating a positive comparison when a row and a predetermined binary character admit of a corresponding relationship; and identifying said presented character as a known type when each predetermined characteristic associated with said type is in correlation with a corresponding row of binary signals regardless of the array within which the row of binary signals is included.

7. Character recognizing apparatus comprising:

analyzing means for generating binary signals representing the information content of a geometric pattern corresponding to a presented character;

storage means coupled to said analyzing means for storing said binary signals, said stored binary signals representing a plurality of data field geometric configurations that are in approximate conformity with the geometric pattern of said presented character;

sampling means coupled to said storage means for sampling successive areas of each of said data field geometric configurations to determine a correspondence between the information content of each sampled area and one of a predetermined number of binary characters and to provide an indication of such correspondence, each of said binary characters representing a pre-established area content;

sequence detecting means coupled to said sampling means for registering, in sequence, each successive determined correspondence regardless of the particular data field geometric configuration the correspondence occurs in; and means for comparing the sequence of correspondence to a plurality of known sequences whereby said presented character is recognized as a known type when said sequence of correspondence is equal to that known sequence associated with said known type.

8. Character recognizing apparatus in accordance with claim 7 wherein said storage means is comprised of a multiple of individual stages, each said stage adapted to store a binary signal; and wherein groups of said stages represent corresponding areas of said data field geometric configuration.

9. Character recognizing apparatus in accordance with claim 8 wherein said sampling means comprises:

a plurality of coincidence means each including input terminals adapted to be supplied with the binary signals stored in selected stages of a group of stages, the number of coincidence means being equal to said predetermined number of binary characters, and each said coincidence means producing an output signal when a unique combination of binary signals is supplied to the input terminals thereof from a unique selection of stages; and means for coupling the input terminals of all of said plurality of coincidence means to those selected stages associated therewith in each succeeding group of stages in a sequential manner.

10. Character recognizing apparatus in accordance with claim 9 wherein said sequence detecting means comprises:

a plurality of stepping means each including input terminals coupled to selected ones of said coincidence means, the number of stepping means being equal to the number of said known types, and each said stepping means including an output terminal adapted to be successively coupled to each input terminal thereof at a rate equal to the rate at which said input terminals of said coincidence means are coupled to succeeding groups of stages whereby an output signal produced by a coincidence means and supplied to an input terminal of said stepping means is provided at said output terminal if said output terminal is coupled to that input terminal;

means for advancing the coupling of said output terminal of a stepping means from a given input terminal thereof to the next succeeding input terminal thereof in response to the provision of an output signal at the output terminal of said stepping means;

and means for indicating when the output terminal of one of said stepping means has been advanced to be coupled to the last input terminal thereof, thereby detecting a completed predetermined sequence of produced output signals, whereby said presented character is recognized as the type associated with said one stepping means.

11. Character recognizing apparatus in accordance with claim 10 wherein said storage means includes:

a plurality of columns of said stages to store corresponding columns of binary signals, said binary signals being shiftable through said storage means in a column by column time sequential manner, and wherein a column of binary signals represents the information content of a corresponding column of said geometric pattern; and means for detecting when columns of binary signals representing an entire data field geometric configuration have been shifted into said storage means and said data field geometric configuration is centered therein.

12. Character recognizing apparatus in accordance with claim 11 wherein said means for detecting comprises:

sensing means coupled to a centrally disposed column in said storage means to sense the storage of a predetermined binary signal in any one of the stages in said centrally disposed column; and means responsive to said sensing means for generating at a predetermined time subsequent to the sensing of said predetermined binary signal a positioning signal indicating that said data field geometric configuration is centered in said storage means, said predetermined time corresponding to the time required to shift a column of binary signals through a determined number of columns.

13. Character recognizing apparatus in accordance with claim 12 wherein said means for advancing the coupling of said output terminal of a stepping means from a given input terminal thereof to the next succeeding input terminal comprises:

counter means coupled to said output terminal for incrementing the count thereof in response to the provision of each output signal at said output terminal to thereby advance the coupling of said output terminal of said stepping means; and enable means coupled to said counter means and responsive to said positioning signal to enable said counter means to be incremented, said counter means being disabled in the absence of said positioning signal.

14. Character recognizing apparatus in accordance with claim 13 wherein at least one of said concidence means includes at least one input terminal coupled to a selected stage of a succeeding group of stages; at least one of said coincidence means includes at least one input terminal coupled to a selected stage of at least one preceding group of stages; and at least one of said coincidence means includes at least one input terminal coupled to a selected stage of a succeeding group of stages and at least one input terminal coupled to a selected stage of at least one preceding group of stages.

15. Character recognizing apparatus in accordance with claim 7 wherein said analyzing means comprises:

a linear array of scanning means adapted for relative motion with respect to said presented character to serially produce voltages representative of the information content of each scanned section of said presented character; and quantizing means coupled to said scanning means for quantizing said serially produced voltages at plural quantizing levels to generate a corresponding plurality of binary signals for each produced voltage whereby nonuniformities in said presented character are compensated.

16. Character recognizing apparatus in accordance with claim 15 wherein said storage means comprises a plurality of register means equal in number to said plural quantizing levels, each of said register means including a multiple of individual stages arranged in columns and rows and adapted to shift binary signals therethrough; one of said register means being adapted to receive binary signals generated by said quantizing means when said serially produced voltages exceed a first quantizing level to thereby store a normalized data field geometric configuration that represents a character formed of relatively thick strokes, another of said register means being adapted to receive binary signals generated by said quantizing means when said serially produced voltages exceed a second quantizing level less than said first quantizing level to thereby store a data field geometric configuration that represents a character formed of relatively normal strokes, and a further one of said register means being adapted to receive binary signals generated by said quantizing means when said serially produced voltages exceed a third quantizing level less than said second quantizing level to thereby store a normalized data field geometric configuration that represents a character formed of relatively thin strokes.

17. Character recognizing apparatus in accordance with claim 16 wherein said sampling means comprises:

a plurality of coincidence means each including input terminals adapted to be supplied with the binary signals stored in selected ones of a row of stages for producing an output signal when a unique combination of binary signals are supplied from a unique selection of stages, the number of coincidence means being equal to said predetermined number of binary characters; and supply means for supplying in a row by row manner the binary signals stored in the selected stages of a row of each successive register means to the input terminals of all said coincidence means, said coincidence means being simultaneously supplied with binary signals from a register row.

18. Character recogniing apparatus in accordance with claim 17 wherein said supply means comprises:

shift means coupled to each register means for advancing the contents of each row to the next preceding row in a timed periodic manner; and switch means coupled to each stage of a given row of each register means for simultaneously applying the input terminals of all said coincidence means to the selected stages in said given row, and for consecutively coupling all said coincidence means to each of said register means intermittent the period for advancing said contents of a row to a next preceding row.

19. Character recognizing apparatus in accordance with claim 18 wherein said sequence detecting means comprises:

a plurality of stepping means equal in number to the number of said known types, each said stepping means including input terminals coupled to selected ones of said coincidence means and an output terminal adapted to be successively coupled to each said input terminal thereof, whereby an output signal produced by a coincidence means is proivided at said output terminal if said output terminal is coupled to that input terminal to which said coincidence means is coupled;

means for advancing the coupling of said output terminal of a stepping means from a given input terminal to the next succeeding input terminal thereof in response to the provisions of an output signal at the output terminal of said stepping means; and means for indicating when the output terminal of one of said stepping means has been advanced to be coupled to the last input terminal thereof, thereby detecting a completed predetermined sequence of produced output signals regardless of the particular register means the selected combinations of binary signals resulting in said sequence of output signals are stored in, whereby said presented character is recognized as the type associated with said one stepping means.

20. Character recognizing apparatus in accordance with claim 19 wherein said advancing means includes enabling means responsive to a signal indicating that an entire data field geometric configuraton has been shifted into said shift register means and said data field geometric configuration is centered therein for enabling said advancing means to couple said output terminal of a stepping means from one input terminal to the next succeeding input terminal.

21. Character recognizing apparatus in accordance with claim 20 wherein said storage means further includes positioning means for generating a positioning signal indicating that an entire data field geometric configuration has been shifted into said register means and said data field geometric configuration is centered therein, said positioning means comprising:

sensing means coupled to a centrally disposed column in one of said register means to sense the storage of a predetermined binary signal in any one of the stages therein; and means responsive to said sensing means for generating said positioning signal at a predetermined time subsequent to the sensing of said predetermined binary signal, said predetermined time corresponding to the time required to shift a column of binary signals through a determined number of columns.

22. Character recognizing apparatus in accordance with claim 21 wherein said plurality of coincidence means includes:

at least one coincidence means having at least one input terminal adapted to be supplied with a binary signal stored in a selected stage in a row succeeding said given row;

at least one coincidence means having at least one input terminal adapted to be supplied with a binary signal stored in a selected stage in at least one row preceding said given row;

and at least one coincidence means having at least one input terminal adapted to be supplied with a binary signal stored in a selected stage in a row succeeding said given row and having at least one input terminal adapted to be supplied with a binary signal stored in a selected stage in at least one row preceding said given row.

23. A character recognition system for identifying a presented character as being a known type, comprising:

scanning means for generating an array of voltages representing the information content of a scanned pattern corresponding to said presented character;

multi-level quantizing means coupled to said scanning means for quantizing said array of voltages at plural quantizing levels to form a corresponding plurality of weighted data field geometric configurations consisting of rows of binary signals; each of said weighted data field geometric configurations representing a normalized scanned pattern thereby compensating for nonuniformities in said presented character;

means for correlating each row of binary signals of each weighted data field geometric configuration with predetermined binary words in a row by row sequential manner, a given row in each data field geometric configuration being correlated with said predetermined binary words before a next succeeding row is correlated;

means for detecting each binary word with which each row is in correlation;

means for registering the sequence of detection regardless of the particular weighted data field geometric configuration within which the correlated rows are included to determine the order in which said detected binary words are arranged to form a representation of said scanned pattern; and means for comparing said determined order with a plurality of pre-established orders, each said pre-established order being associated with a known type, whereby said presented character is identified as the known type associated with the one pre-established order with which said determined order favorably compares.

24. A character recognition system in accordance with claim 23 wherein said correlating means comprises comparator means to which selected ones of said binary signals included in a row are supplied in a row by row manner by each weighted data field geometric configuration to determine if said selected ones of said binary signals form, in combination, one of said predetermined binary words.

* * * * *